US012125267B2

(12) United States Patent
Quinton et al.

(10) Patent No.: US 12,125,267 B2
(45) Date of Patent: Oct. 22, 2024

(54) SYSTEM AND METHOD FOR COMPOSITE TRAINING IN MACHINE LEARNING ARCHITECTURES

(71) Applicant: Singulos Research Inc., Burnaby (CA)

(72) Inventors: Bradley Quinton, Vancouver (CA); Trent McClements, Burnaby (CA); Michael Scott Lee, North Vancouver (CA); Scott Chin, Vancouver (CA)

(73) Assignee: Singulos Research Inc., Burnaby (CA)

( * ) Notice: Subject to any disclaimer, the term of this patent is extended or adjusted under 35 U.S.C. 154(b) by 468 days.

(21) Appl. No.: 17/577,892

(22) Filed: Jan. 18, 2022

(65) Prior Publication Data
US 2022/0327811 A1 Oct. 13, 2022

Related U.S. Application Data

(60) Provisional application No. 63/173,151, filed on Apr. 9, 2021.

(51) Int. Cl.
G06V 10/774 (2022.01)
G06N 3/08 (2023.01)
G06V 10/82 (2022.01)

(52) U.S. Cl.
CPC .......... G06V 10/7747 (2022.01); G06N 3/08 (2013.01); G06V 10/82 (2022.01)

(58) Field of Classification Search
CPC .... G06V 20/698; G06V 10/44; G06T 7/0012; G06T 2207/20084; G06N 20/00; G06N 3/08
See application file for complete search history.

(56) References Cited

U.S. PATENT DOCUMENTS

| 6,714,687 B2 * | 3/2004 | Itagaki | G06T 9/008 382/250 |
| 7,486,832 B2 * | 2/2009 | Kim | G11B 20/1217 382/233 |
| 8,306,116 B2 * | 11/2012 | Imajou | H04N 19/117 375/240.12 |
| 8,339,415 B2 * | 12/2012 | Sekizawa | G11B 27/34 345/619 |
| 8,358,877 B2 * | 1/2013 | Noguchi | H04N 19/137 382/243 |

(Continued)

*Primary Examiner* — Yosef Kassa
(74) *Attorney, Agent, or Firm* — Borden Ladner Gervais LLP; Todd Keeler

(57) ABSTRACT

The present disclosures provides systems and methods for generating composite based data for use in machine learning systems, such as for use in training a machine learning system on the composite based data to identify an object of interest. In an aspect, a method of generating composite based data for use in training machine learning systems comprises: receiving a plurality of images, each of the plurality of images having a corresponding label; generating a composite image comprising the plurality of images, each of the plurality of images occupying a region of the composite image; generating a response map for the composite image, the response map having a plurality of response entries, each response entry encoded with a desired label corresponding to a fragment of the composite image, and generating composite data comprising the desired label of a response entry and image data corresponding to the fragment of the composite image.

25 Claims, 16 Drawing Sheets

(56) References Cited

U.S. PATENT DOCUMENTS

| | | | |
|---|---|---|---|
| 9,785,242 B2 * | 10/2017 | Parshionikar | G06V 40/19 |
| 9,792,534 B2 * | 10/2017 | Wang | G06V 10/454 |
| 9,811,765 B2 * | 11/2017 | Wang | G06F 18/24143 |
| 10,565,518 B2 * | 2/2020 | Jin | G06N 20/00 |
| 10,658,005 B1 * | 5/2020 | Bogan, III | G06V 40/175 |

* cited by examiner

SYSTEM AND METHOD FOR COMPOSITE TRAINING IN MACHINE LEARNING ARCHITECTURES

CROSS REFERENCE

This application claims the benefit of priority of U.S. Provisional Patent Application No. 63/173,151, filed on Apr. 9, 2021, and entitled SYSTEM AND METHOD FOR COMPOSITE TRAINING IN MACHINE LEARNING ARCHITECTURES, the entirety of which is incorporated herein by reference.

FIELD

The present disclosure relates generally to machine learning systems, and more particularly to generating composite-based data for use in training machine learning systems and even more particularly to generating composite-based data from composite images and corresponding desired response maps.

BACKGROUND

A common task for Machine Learning Systems is processing Image Data, a type of Input Data created by projecting a signal onto one or more physical surfaces or sensors. The signal source may be one of many types including but not limited to visible light, electromagnetic radiation (infrared, thermal), sonar, RADAR, LiDAR, electron microscope or others. Image Data contains spatial features that can be organized in representations in two-dimensional, or higher-dimensional, space. Input Data includes one or more data elements applied to a Machine Learning System. Specific examples of Input Data are Image Data, audio data, GPS co-ordinates, purchasing habits, personal data, etc.

Machine Learning Systems generally, are systems that can be trained to process and analyze specific data sets to produce a decision or judgement, or to generate new data. Machine Learning Systems are trained using a Training Process. A Training Process generally includes the process in which, using various search and optimization processes (e.g., backpropagation), the Parameters of the Machine Learning System are iteratively adjusted based the evaluation of a Cost Function. In other words, the Training Process is the process of finding a set of Parameters for a given Machine Learning System that achieve a prediction goal of the system.

In some cases, the Training Process proceeds iteratively with the Parameters being updated and the Cost Function evaluated until the training Cost (e.g. a measurement of deviation of one or more a given Predictions from one or more Labels; the Cost is calculated by the Cost Function) goal is achieved, the maximum number of allowed iterations have completed, or some other condition or constraint is met. Parameters include the internal states of the Machine Learning System that are changed during the Training Process and recorded for use when the Machine Learning System is tested or used in a Deployed Scenario when the trained, and optionally tested, Machine Learning Systems can be used to generate Predicted Labels (e.g. the Label generated by the Machine Learning System for given Input Data) for never-before-seen Input Data. Often this Input Data is supplied by another higher-level system and the Predicted Labels are passed back to the higher-level system.

Cost Functions generally measure the accuracy of a given Prediction (e.g. the process of generating a Predicted Label) versus a Label (e.g. examples of desired outputs of a Machine Learning System). During the Training Process, the Cost Function acts as a proxy to results of the Prediction Engine (e.g. the portion of the Machine Learning System that processes the output of the Machine Learning Engine to predict the Label), in the sense that lowering the Cost, should lead to more accurate Predictions from the Prediction Engine, (however, this is not strictly true, and it is possible that lowering the Cost according to the Cost Function does not improve the accuracy of the Predicted Labels). The Cost Function result is used to update the Parameters of the Machine Learning Engine with the goal of finding a set of Parameters which lowers the Cost. This can be done with a number of search and optimization methods including backpropagation, etc.

The Machine Learning Engine generally includes the portion of the Machine Learning System that is trained during the Training Process. The output of the Machine Learning Engine is processed by the Prediction Engine to predict the Label. Machine Learning Engine and the Prediction Engine define the complete processing capabilities of the system and can be used to deterministically generate a Predicted Label from any given Input Data.

Some examples of Image Data processing tasks are Image Classification, object detection and Dynamic Object Comprehension. Image Classification generally includes the Classification problem for when the input is Image Data. Specifically, given Image Data, the system predicts to which class the image belongs. In practice, a system designed to perform Image Classification supports a finite set of classes. A class may represent a specific type of object, or a more abstract concept such as an Out-Of-Scope. Dynamic Object Comprehension generally includes simultaneous, real-time, identification, localization and tracking of one or many Objects of Interest across one or many object classes. Thereby enabling real-time interaction between physical and virtual worlds and unlocking next generation applications ranging from augmented reality/mixed reality and robotics to on-line advertising and retail experiences. An Object of Interest generally includes an object that is the subject of processing or analysis to increase the systems understanding of some aspect of the object. This processing may be done with Machine Learning Systems or other systems capable of processing Image Data. Specific examples of an Object of Interest include a LEGO™ brick, a chess piece, dye, figurine, etc.

There are many ways to implement a Machine Learning System, including using an artificial neural network, recurrent neural networks, convolutional neural networks, logistic regression, support vector machines, etc. These Machine Learning Systems are used for a large variety of applications including Image Classification, object detection, Dynamic Object Comprehension, etc.

Problems arise however, when creating Training Data for Image Data processing. One of but many example problems includes that, for each type of Object of Interest, examples of all the variations of how the Object of Interest may be projected on to the Image Sensor may be required. The task of creating, enumerating, tracking and managing these variations is often prohibitively large in terms of both specification effort and computational cost. Another example problem includes that, processing of the Training Data set required for all the variations during the Training Process can potentially exceed available computational resources.

It remains desirable therefore, to develop further improvements and advancements in relation to Machine Learning Systems, including but not limited to improving the efficiency of generating Training Data, improving the efficiency of the Training Process for Image Data (and other Input Data), and to overcome shortcomings of known techniques, and to provide additional advantages thereto.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments of the present disclosure will now be described, by way of example only, with reference to the attached Figures.

Figure 1:
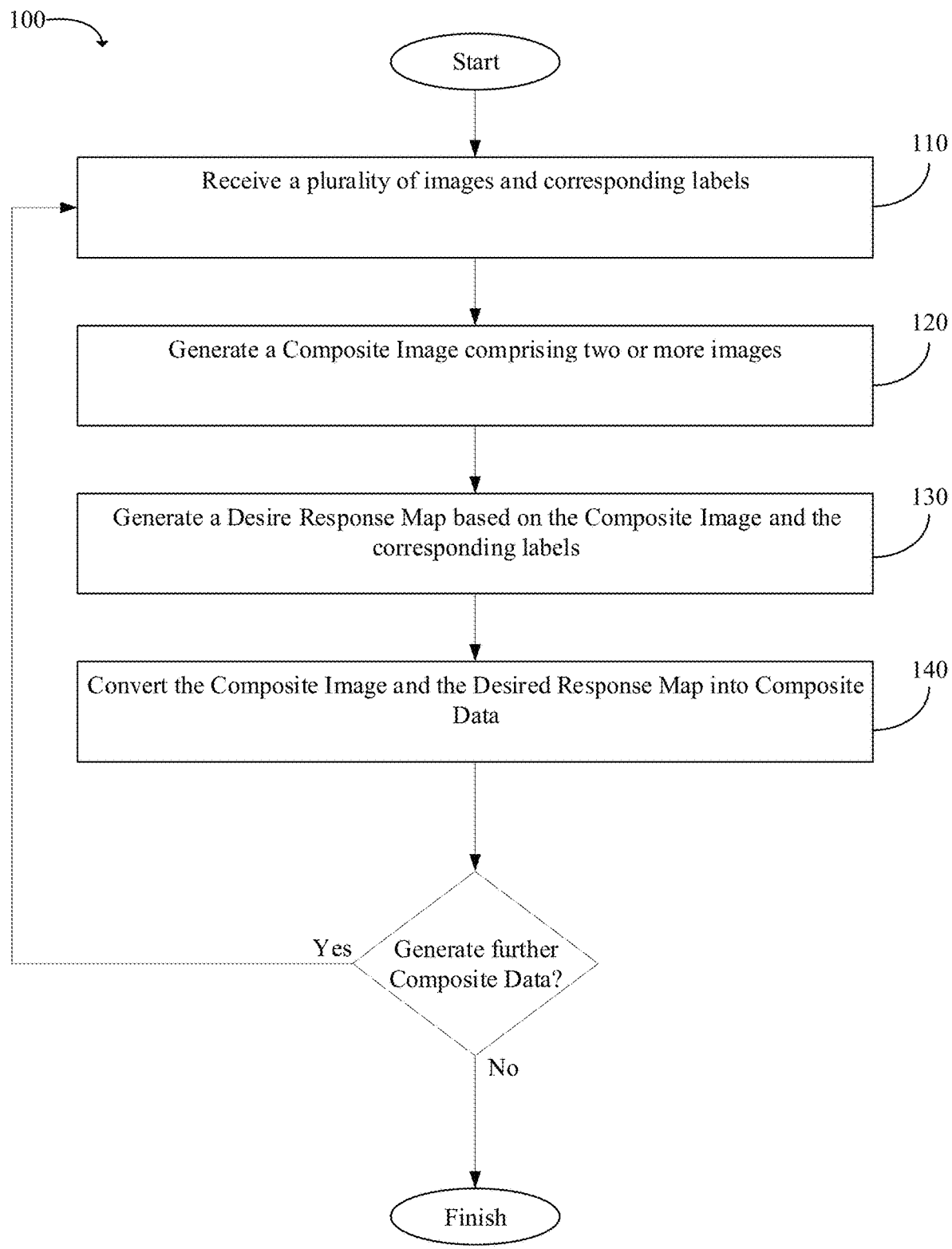
FIG. 1 is a flow chart of a method for generating Composite Data in accordance with an embodiment of the present disclosure, for use in training a Machine Learning System.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompasses by the corresponding description.

DETAILED DESCRIPTION

The following are examples of systems and methods for classifying a vehicle location in accordance with the present disclosure.

According to an aspect, the present disclosure provides a method of generating composite based data for use in training machine learning systems, comprising receiving a plurality of images, each of the plurality of images having a corresponding label; generating a composite image comprising the plurality of images, each of the plurality of images occupying a region of the composite image; generating a response map for the composite image, the response map having a plurality of response entries, each response entry encoded with a desired label corresponding to a fragment of the composite image, and generating composite data comprising the desired label of a response entry and image data corresponding to the fragment of the composite image.

In an example embodiment, generating the plurality of response entries for the response map, comprises, for each of the plurality of response entries: visiting the fragment of the composite image corresponding to the response entry; determining the desired label based on assessing image data associated with the visited fragment, and encoding the response entry with the desired label.

In an example embodiment, encoding the response entry further comprises assessing the image data associated with the visited fragment against a labeling criteria, and encoding the response entry with the desired label associated with an in-scope response when the assessed image data complies with the labeling criteria.

In an example embodiment, generating the plurality of response entries for the response map further comprises: for each of the plurality of response entries: encoding the response entry with a location within the composite image corresponding to the visited fragment.

In an example embodiment, encoding the response entry further comprises: encoding the response entry with the desired label associated with a different response entry, when: the assessed image data does not comply with the labeling criteria; the different response entry complies with the labeling criteria, and a location of the different response map entry is within a distance of a location of the response entry.

In an example embodiment, the labeling criteria comprises whether the assessed image data includes an object of interest centered within the assessed image data.

In an example embodiment, generating composite based data further comprises partitioning the composite image into a plurality of non-overlapping regions, wherein each image of the plurality of images occupies a different non-overlapping region of the composite image.

In an example embodiment, generating composite based data further comprises partitioning the composite image into a plurality of non-overlapping regions, wherein each image of the plurality of images occupies a center location of a different non-overlapping region of the composite image.

In an example embodiment, generating the composite data comprises extracting, from the composite image, a plurality of image fragments, each corresponding to the image data of a given fragment of the composite image, and extracting, from the response map, a plurality of desired labels, each corresponding to the desired label of a given response entry of the response map wherein the composite data comprises the plurality of image fragments and the plurality of desired labels corresponding thereto.

In an example embodiment, generating composite based data further comprises: providing the composite data to a machine learning system for use in training the machine learning system during a training process thereof, wherein providing the composite data comprises: providing, to the machine learning system during the training process, the plurality of image fragments on the fly with the extracting thereof, and providing, to the machine learning system during the training process, the plurality of desired labels on the fly with the extracting thereof.

In an example embodiment, extracting the set of image fragments and the set of desired labels, comprises: striding a sliding window about the composite image and correspondingly about the response map, and observing, at each stride: an image fragment of the composite image based on an area of the composite image occupied by the sliding window, and a corresponding desired label of the response map based on an area of the response map occupied by the sliding window; wherein the plurality of fragment images comprises the observed image fragments, and the plurality of desired labels comprises the observed corresponding desired labels.

In an example embodiment, a dimension of the sliding window matches an input dimension of a machine learning system.

In an example embodiment, generating composite based data further comprises: providing the composite image to a machine learning system for use in training the machine learning system to generate the response map, the machine learning system configured to generate a machine learning response map based on emulating a sliding window effect about the composite image.

In an example embodiment, the machine learning system is a convolutional neural network having convolutional layers for use in implementing the sliding window effect.

In an example embodiment, generating composited based data further comprises: evaluating a loss between the machine learning response map and the response map, and adjusting a parameter of the machine learning system based on the evaluated loss.

In an example embodiment, a stride of the sliding window effect is 1 and evaluating the loss comprises directly minimizing the loss between the machine learning response map and the response map.

In an example embodiment, a stride of the sliding window effect is greater than 1 and a dimension of the machine learning response map is less than a dimension of the response map, the method further comprising: generating a reinterpreted machine learning response map based on sampling the machine learning response map with a sliding window having a stride selected to cause a dimension of the reinterpreted machine learning response map to match the dimension of the response map, and evaluating the loss comprises directly minimizing the loss between the reinterpreted machine learning response map and the response map.

In an example embodiment, encoding the response entry further comprises: assessing the image data of the visited fragment against a first labeling criteria and a second labeling criteria; encoding the response entry with the desired label associated with an in-scope response when the assessed image data complies with either the first or second labeling criteria, or complies with both labeling criteria.

In an example embodiment, encoding the response entry further comprises: assessing the image data of the visited fragment against a first labeling criteria and a second labeling criteria; encoding the response entry with the desired label associated with an in-scope response when the assessed image data complies with the first labeling criteria, and encoding the response entry with the desired label associated with an out-of-scope response when the assessed image data does not comply with the first labeling criteria and does comply with the second labeling criteria.

In an example embodiment, encoding the response entry further comprises: encoding the response entry with the desired label associated with a don't-care response when the assessed image data does not comply with the first labeling criteria and does not comply with the second labeling criteria.

In an example embodiment, the first labeling criteria comprises whether the assessed image data includes an object of interest.

In an example embodiment, the first labeling criteria comprises whether the assessed image data includes an object of interest centered within the assessed image data.

In an example embodiment, the second labeling criteria comprises whether the response entry for the fragment of the assessed image data is within a distance of a different response entry that complies with the first labeling criteria.

In an example embodiment, the plurality of response entries correspond to a subset of all possible fragments of the composite image.

In an example embodiment, a dimension of the fragment of the composite image matches an input dimension of a machine learning system.

According to an aspect, the present disclosure provides A non-transitory computer-readable medium having instructions stored thereon that, when executed by a computing device, cause the computing device to perform a method of generating composite based data for use in training machine learning systems.

The systems and methods for composite based training machine learning architectures as disclosed herein provide numerous improvements and advantages over conventional systems, as may be realized for example in applications predicated on object recognition, such as in Mixed-Reality and Augmented-Reality applications. For example, for many real applications, collecting Image Data of all variations for an Object of Interest is expensive or even infeasible because of the significant number of variations. For example, variations of the same Object of Interest at every possible scale and/or rotation may generate a significant amount of Image Data. There are numerous other examples of variations which may prove expensive or infeasible to collect Image Data for, including but not limited to translating spatial dimensions of the Object of Interest. Accordingly, collecting examples of all combinations of possible variations is a limiting factor for many Image Data processing tasks. The systems and methods disclosed herein however may produce superior effects over existing techniques, achieved in a computationally efficient manner, improving the overall Training Process efficiency for a Machine Learning System.

FIG. 1 illustrates a method 100 for generating Composite Data in accordance with an embodiment of the present disclosure for use in training a Machine Learning System. The operation of method 100 is not intended to be limiting but rather illustrates an example of generating Composite Data. In some embodiments, method 100 may be accomplished with one or more additional operations not described, and/or without one or more of the operations described. Similarly, the order in which the operation of method 100 is illustrated and described below is not intended to be limiting, but rather illustrative of an example of generating Composite Data in accordance with the present disclosure.

In some embodiments, method 100 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

The method 100 may include an operation 110 for receiving Training Data for a Machine Learning System. The Training Data may comprise a plurality of images and corresponding labels for the plurality of images for use generating Composite Data through other operations of the method 100.

The method 100 may include an operation 120 for generating a Composite Image from the plurality of images. Each generated Composite Image may comprise two or more images from the plurality of images. Embodiments for generating a Composite Image include overlapping and non-overlapping placement of images within the Composite Image, segmenting images with bounding boxes, segmenting images based on an outline of the image, padding images, using placement algorithms to place images within the Composite Image, subdividing the Composite Image into regions wherein each region may contain a single image, and other embodiments of a Composite Image and methods of generating the same as disclosed herein.

The method 100 may include an operation 130 for generating a Desired Response Map based on a Composite Image and corresponding labels for the images contained in the Composite Image. Embodiments for generating a Desire Response Map may include visiting each Composite Fragment in the Composite Image; or, visiting a subset of Composite Fragments in the Composite Image, and assessing each visited Composite Fragment to determine a label for a corresponding location in the Desired Response Map. Other embodiments for generating a Desired Response Map in accordance with the present disclosure are further disclosed herein.

The method 100 may include an operation 140 for generating Composite Data based on the Composite Image and the corresponding Desired Response map, as may for example be generated in accordance with operations 120 and 130, respectively, or in accordance with other embodiments as further disclosed herein. Composite Data generally comprises a plurality of Training Elements, each Training Element comprising an image and a corresponding Desired Label, extracted respectively from the Composite Image and the Desired Response generated based on respective operations 120 and 130. Other embodiments for generating Composite Data in accordance with the present disclosure are further disclosed herein.

Operations in accordance with method 100 may be repeated as necessary to generate a plurality of Composite Data sets, each corresponding to a Composite Image and corresponding Desired Response, for use in a Training Process for a Machine Learning System.

Figure 2:
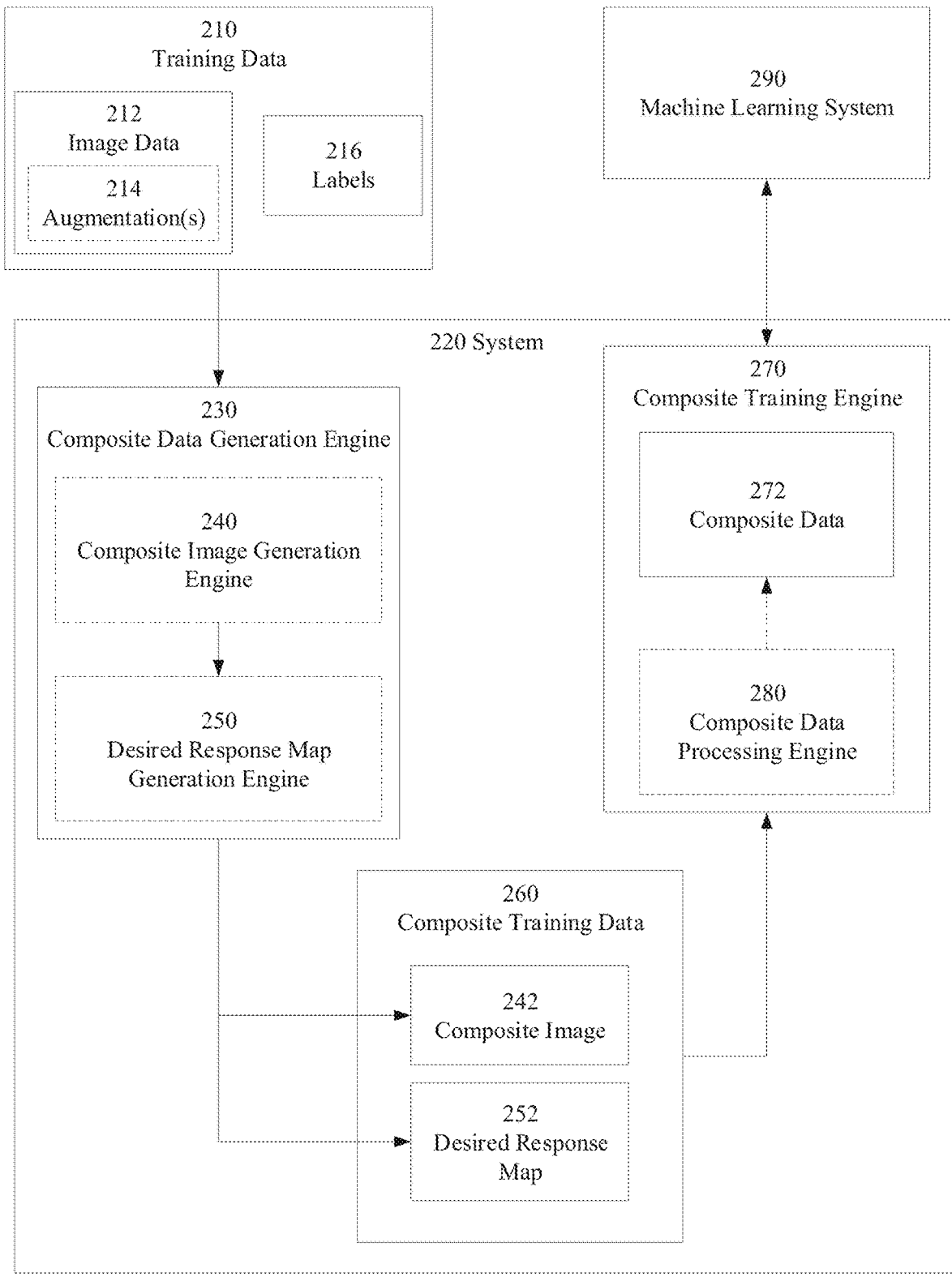
FIG. 2 is block diagram of a system for training a Machine Learning System with Composite Data in accordance with the present disclosure.

FIG. 2 illustrates a block diagram of a System 220 in accordance with an embodiment of the present disclosure. The System 220 receives as an input, Training Data 210 comprising Image Data 212 and corresponding Desired Labels 216. Optionally, the Image Data 212 may include augmentations 214 as may be generated by a Data Augmentation process. For example, the Image Data 212 may be Augmented Image Data 212 generated using a Data Augmentation process for modifying copies of already collected example data and adding those to the Training Data 210. For example, for each image already collected, multiple copies may be made where for example, each image copy is translated spatially by some unique amount, or otherwise augmented. Furthermore, other transforms besides translation may be used to augment data, including but not limited to, rotation, zoom, different background, random noise injection, mirroring, color adjustment, and blur.

The System 220 may include a Composite Data Generation Engine 230 for generating Composite Training Data 260 based on the Training Data 210, wherein the Composite Training Data 260 includes a Composite Image(s) 242 and a corresponding Desired Response Map(s) 252. Embodiments of a Composite Data Generation Engine 230 may comprise a separate Composite Image Generation Engine 240 and a separate Desired Response Map Generation Engine 250 for generating the Composite Image(s) 242 and the Desired Response Map(s) 252, respectively, of the Composite Training Data 260. Embodiments for generating a Composite Image 242 are described further below with reference to FIGS. 3-8; embodiment for generating a Desired Response Map 252 are described further below with reference to FIGS. 9-12. Embodiments of a Desired Response Map Generation Engine 250 receive as input, the Composite Image 242 (as generated by the Composite Data Generation Engine 230 and/or the Composite Image Generation Image 240) and the Training Data 210 used to create the Composite Image 242.

Embodiments of a Composite Data Generation Engine 230 include generating Composite Training Data 260, for storing in memory prior to training a Machine Learning System, such as Machine Learning System 290, or may be generated in real-time during the training process, or on-the-fly during the training process.

The order in which the Training Data 210 is visited by the Composite Data Generation Engine 230 may cause the Composite Data Generation Engine 230 to generate different iterations of Composite Training Data 260. Accordingly, in some embodiments, the Composite Data Generation Engine 230 may visit the Training Data 210 in a first order to generate a first set of Composite Training Data 260, and visit the Training Data 210 in a second order, to generate a second set of Composite Training Data 260. In an embodiment, the Composite Data Generation Engine 230 may generate a plurality of Composite Training Data 260, wherein each Composite Training Data 260 corresponds to the Composite Data Generation Engine 230 visiting the Training Data 210 in a different order.

The System 220 may include a Composite Training Engine 270 for generating Composite Data 272 (e.g. the Composite Training Data having been interpreted or converted back into a conventional Training Data format) for use during a Composite Training Process of a Machine Learning System, such as during the Composite Training Process of Machine Learning System 290. In other words, the Composite Training Engine 270 trains the Machine Learning Engine 290. In an embodiment, the Composite Training Engine 270 includes a separate Composite Data Processing Engine 280, for converting the Composite Training Data 260 into Composite Data 272. In an embodiment, the System 220 provides the Machine Learning System 290 with Composite Data 272 during the training process on a just-in-time basis (e.g. in real-time, on-the-fly, etc.) wherein the Data Generation Engine 230 may be configured to visit the Training Data 210 in a different order at various points of the Training Process, for generating different iterations of the Composite Training Data 260, and therefore different variations of the Composite Data 272 supplied to the Machine Learning System 290.

Figure 3:
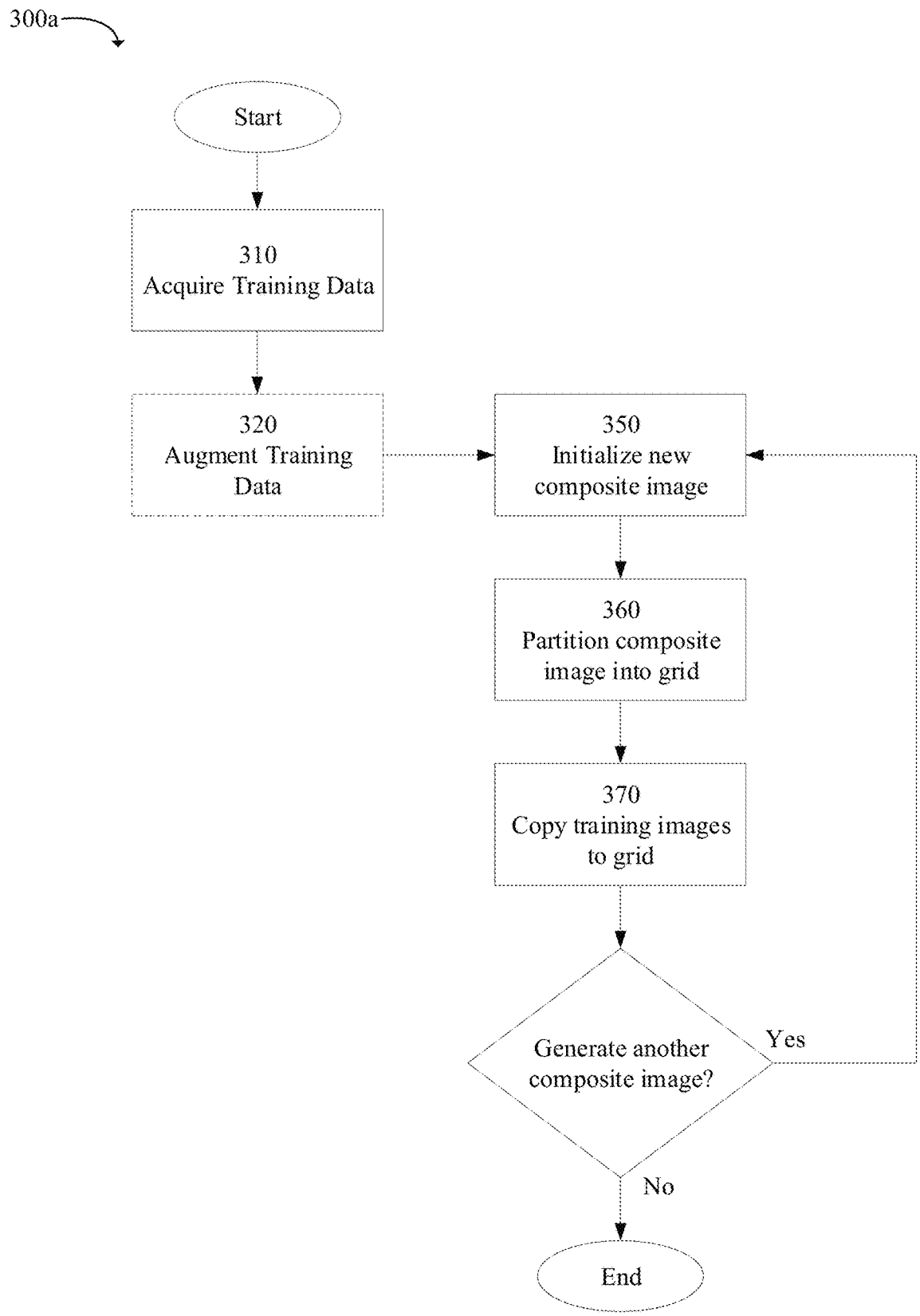
FIG. 3 is a flow chart of a method for generating a Composite Image in accordance with an embodiment of the present disclosure.
Figure 4:
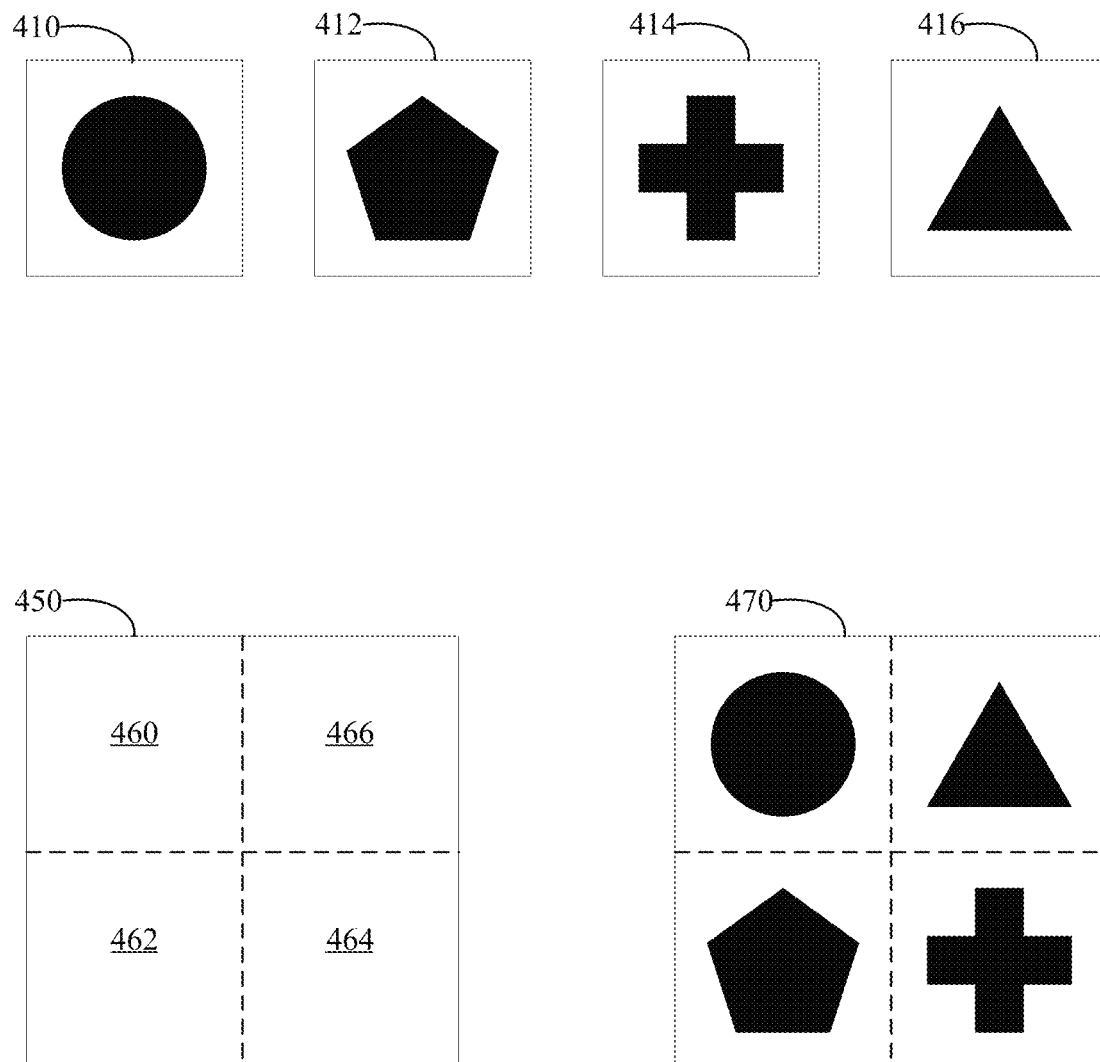
FIG. 4 illustrates the incorporation of a plurality of Image Data into a Composite Image in accordance with an embodiment of the present disclosure.
Figure 5:
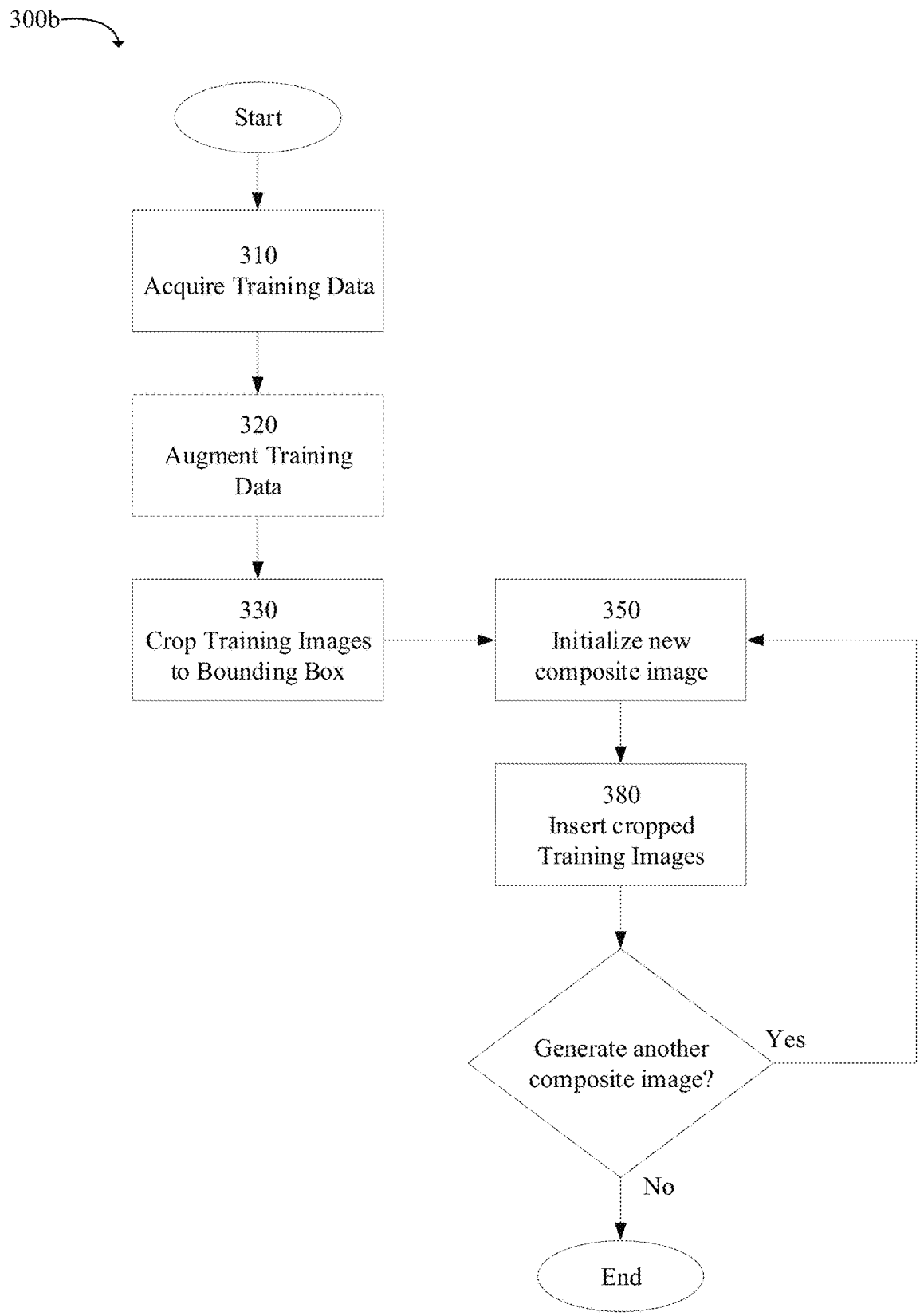
FIG. 5 is a flow chart of a method for generating a Composite Image in accordance with an embodiment of the present disclosure.
Figure 6:
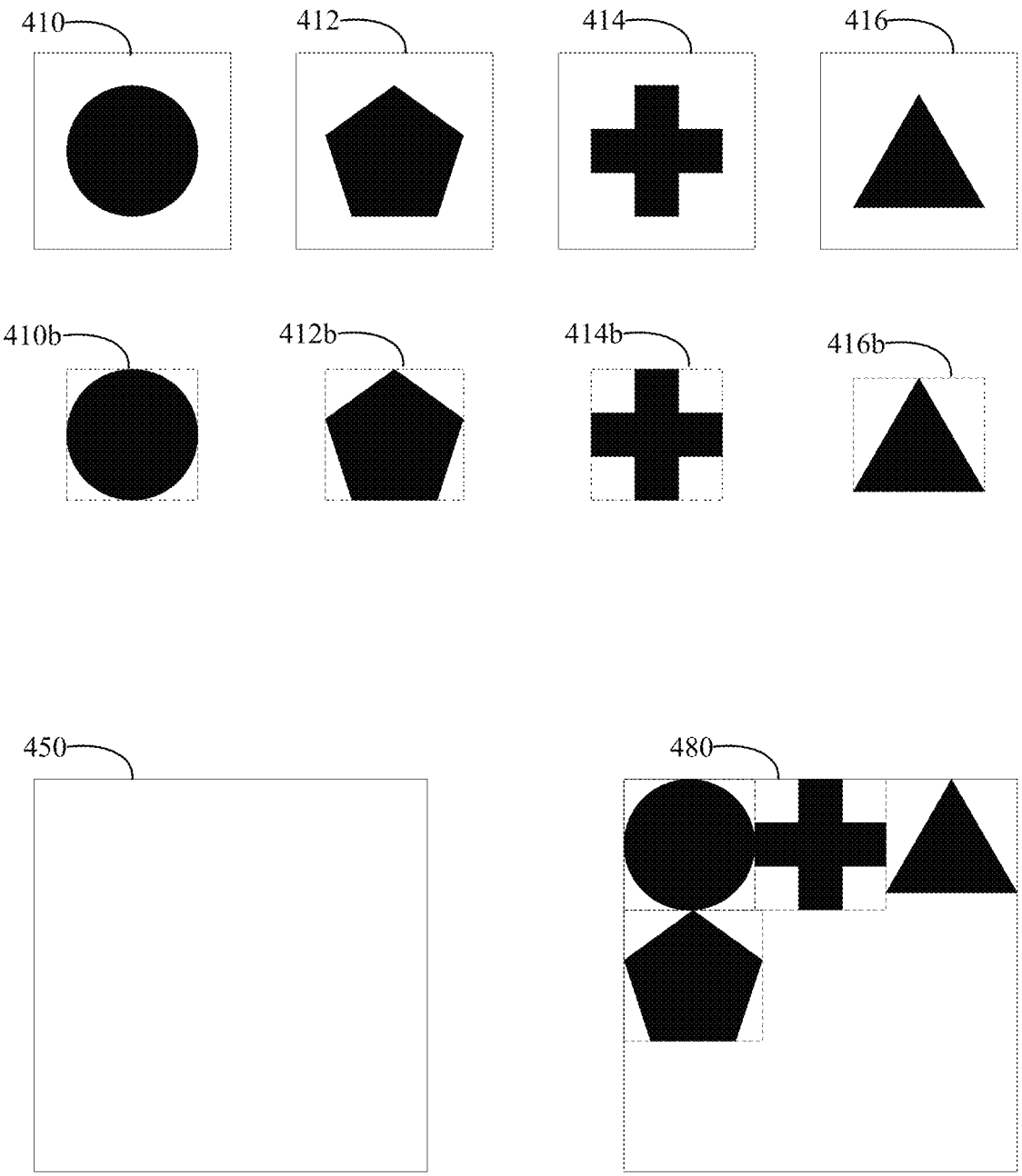
FIG. 6 illustrates the incorporation of a plurality of Image Data into a Composite Image in accordance with an embodiment of the present disclosure.
Figure 7:
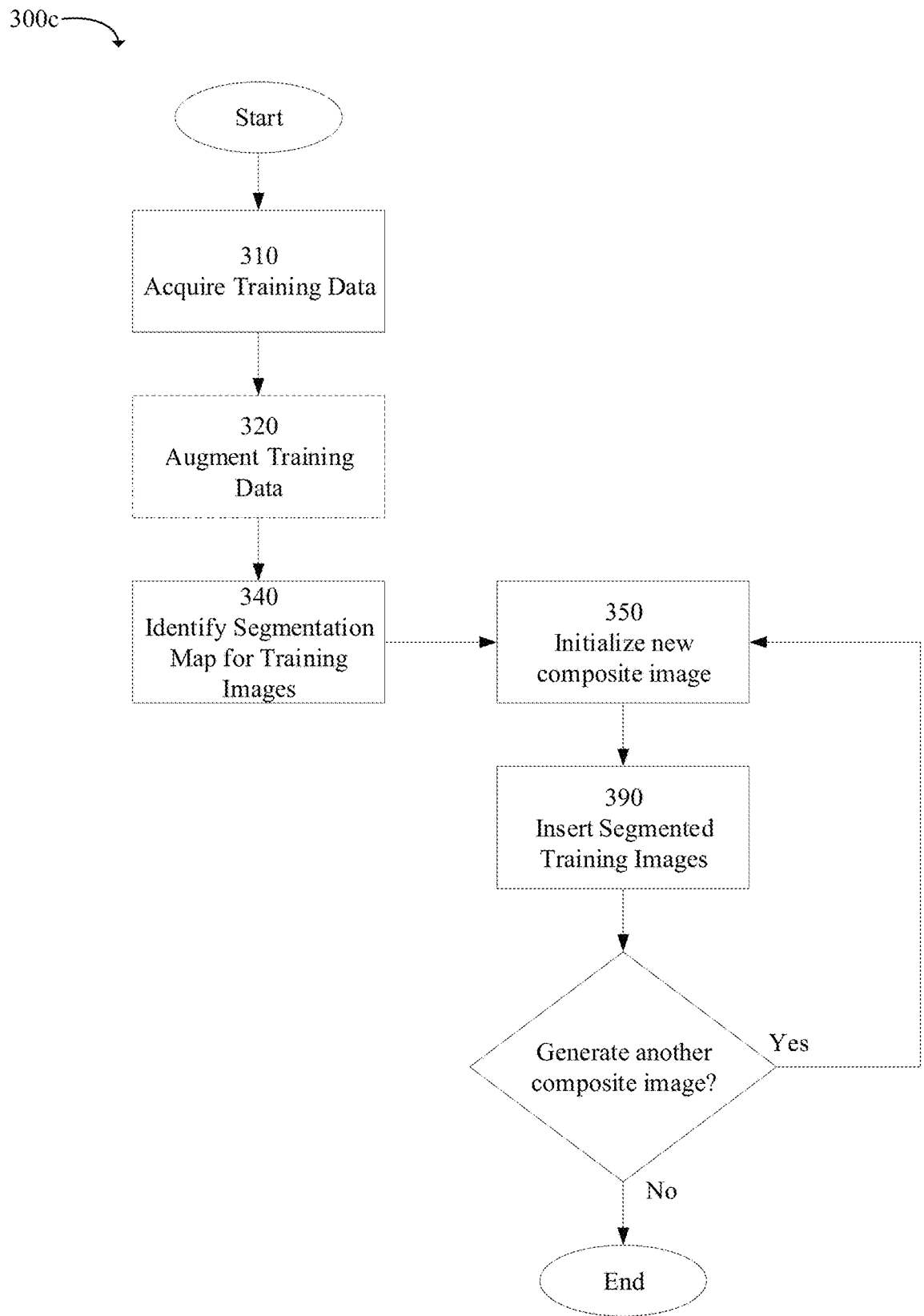
FIG. 7 is a flow chart of a method for generating a Composite Image in accordance with an embodiment of the present disclosure.
Figure 8:
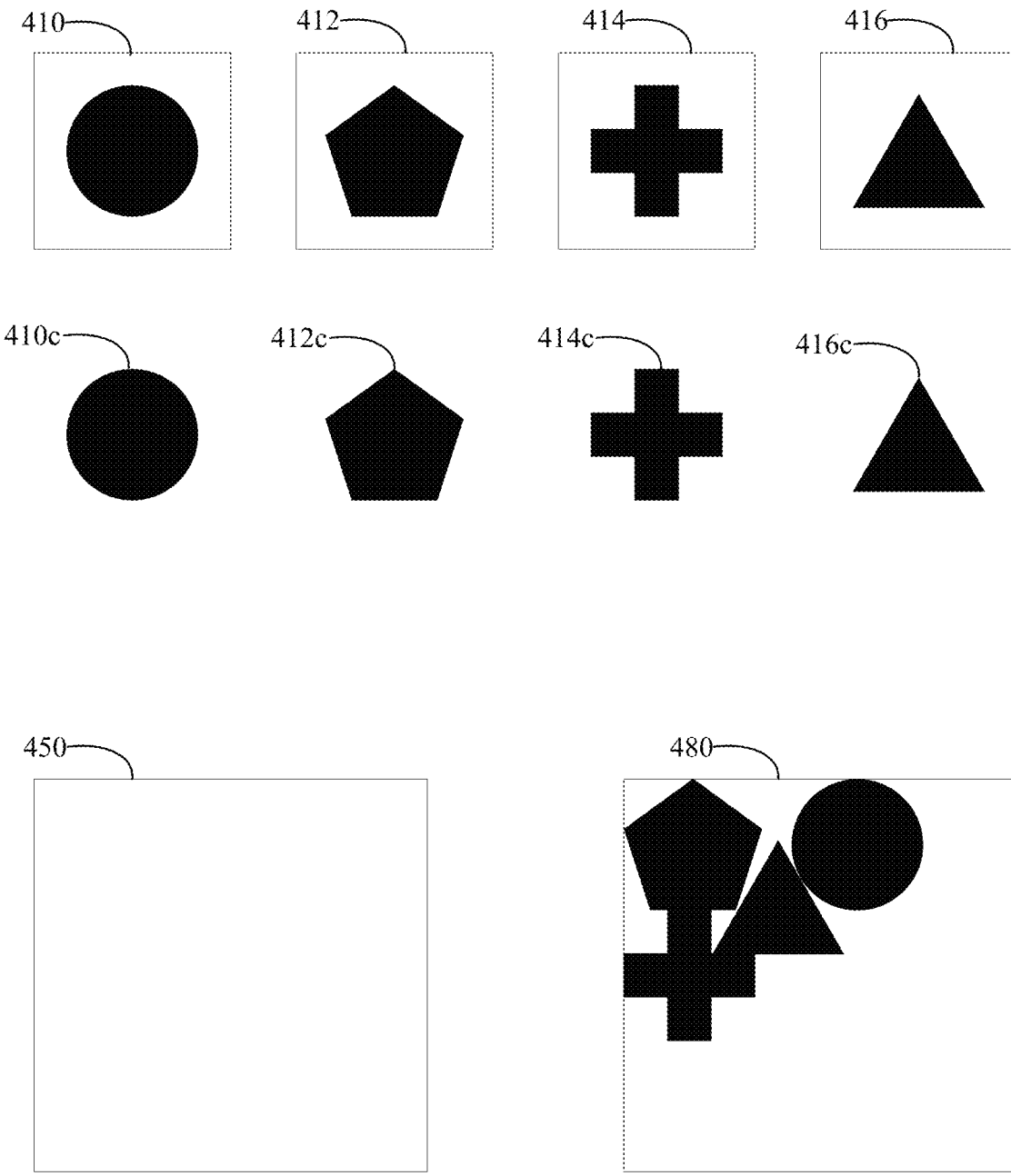
FIG. 8 illustrates the incorporation of a plurality of Image Data into a Composite Image in accordance with an embodiment of the present disclosure.

FIGS. 3, 5, and 7 illustrate methods 300a, 300b, and 300c, for generating a Composite Image, such as respective Composite Images 470, 480, and 490 illustrated in FIGS. 4, 6, and 8, respectively. The methods 300a, 300b, and 300c may for example, reflect operations undertaken by embodiments of a Composite Data Generation Engine and/or a Composite Image Generation Engine in accordance with the present disclosure, such as the Composite Data Generation Engine 230 and the Composite Image Generation Engine 240, respectively, in accordance with the illustrative example of FIG. 2. Similarly, the Composite Images 470, 480, and 490 may reflect embodiments of a Composite Image in accordance with the present disclosure, such as the Composite Image 242 illustrated in FIG. 2.

FIGS. 3, 5, and 7 illustrate the methods 300a, 300b, and 300c, respectively, for generating a Composite Image, such as the Composite Image 242 or the respective Composite Images 470, 480, or 490, in accordance with an embodiment of the present disclosure. The operation of the methods 300a, 300b, and/or 300c is not intended to be limiting but rather illustrates an example of generating a Composite Image. In some embodiments, the methods 300a, 300b, and/or 300c may be accomplished with one or more additional operations not described, and/or without one or more of the operations described. Similarly, the order in which the operation of the methods 300a, 300b, and/or 300c is illustrated and described below is not intended to be limiting, but rather illustrative of an example of generating a Composite Image in accordance with the present disclosure.

In some embodiments, the methods 300a, 300b, and/or 300c may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the methods 300a, 300b, and/or 300c in response to instructions stored electronically on an electronic storage medium. The one or more processing devices may include one or more devices configured through hardware, firmware, and/or software to be specifically designed for execution of one or more of the operations of the methods 300a, 300b, and/or 300c.

FIG. 3 illustrates the method 300a for generating a Composite Image, such as the Composite Image 470 illustrated in FIG. 4. The method 300a may include an operation 310 for acquiring conventional Training Data, such as Training Data 210 illustrated in FIG. 2. The Training Data generally comprises Image Data and Desired Labels, such as Image Data 212 and Desired Labels 216, respectively. The Image Data may comprise a plurality of images and/or Image Data, such as the Image Data 410, 412, 414, and 416 each comprising a respective Object of Interest, in particular a circle, a pentagon, a cross, and a triangle, as illustrated in each of FIGS. 4, 6, and 8.

In an embodiment, method 300a may include optional operation 320 for augmenting the Training Data received in operation 310. For example, an operation 320 may comprise generating Augmented Training Data using a Data Augmentation process, wherein the Training Data is augmented to include additional copies of the Training Data having been augmented with augmentations including but not limited to: translations, transforms, rotations, zooms, different backgrounds, random noise injection, mirroring, color adjustment, and/or blurs. In an embodiment, the Training Data received during operation 310 is Augmented Training Data and an operation 320 may not be required or desired.

The method 300a may include an operation 350 for initializing a new Composite Image, for use in generating a Composite Image such as for example for use in generating the Composite Image 242 or the Composite Images 470, 480, and/or 490. The operation 350 may initialize the Composite Image with an arbitrary background image. For example, the arbitrary background image may be blank white space, such as the initialized Composite Image 450 illustrated in each of FIGS. 4, 6, and 8. Embodiments of a background image may include a pattern, multiple patterns, and/or using multiple colors. Embodiments of a background image may comprise artificial images, and/or real images, (for example, real images of surfaces, structures, and/or textures). Embodiments of a background image may combine, interleave, and overlay the foregoing examples of patterns and images to produce further embodiments of a background image. The operation 350 may initialize a first Composite Image with a first arbitrary background, and may initialize a second Composite Image with a second arbitrary background, and so forth. In an embodiment, the first arbitrary background is different than the second arbitrary background. In an embodiment, the operation 350 may initialize a plurality of Composite Images, each having a different arbitrary background. In an embodiment, the operation 350 may initialize a plurality of Composite Images, a subset of which have the same arbitrary background.

The method 300a may include an operation 360 for partitioning a new/initialized Composite Image in accordance with an embodiment of the present disclosure. Embodiments of partitioning include sub-dividing the initialized Composite Image into a grid comprising a plurality of partitioned regions, each partitioned region corresponding to a cell in the grid capable of being occupied by Image Data. As illustrated in the example of FIG. 4, the initialized Composite Image 450 may be partitioned into a grid comprising a plurality of uniformly sized partitioned regions 460, 462, 464, and 466 in accordance with an embodiment of the operation 360. Each of the regions 460, 462, 464, and 466 may receive Image Data, such as the Image Data 410, 412, 414, and 416. For example, respective Image Data 410, 412, 414, and 416 may occupy respective first, second, third, and fourth partitioned regions 460, 462, 464, and 466; other arrangements are possible.

The method 300a may include an operation 370 for copying the Image Data into the partitioned Composite Image. The Image Data may centrally occupy a partitioned region or may be arbitrarily offset therefrom or otherwise arbitrarily located within a partitioned region. As illustrated in the example of FIG. 4, the Composite Image 470 includes the Image Data 410, 412, 414, and 416 centrally occupying the respective first, second, third, and fourth partitioned regions 460, 462, 464, and 466. In an embodiment, the Image Data is cropped to fit within a partitioned region. Embodiments of a Composite Image may comprise a plurality of Image Data wherein one or more partitioned regions are left unpopulated with any Image Data. In an embodiment, one or more perimeters of the Composite Image may be padded wherein the Image Data is not copied into, or otherwise does not occupy, the padded region of the Composite Image.

Other embodiments of a method 300a may exclude operations 360 and 370 and may rather copy the Image Data into arbitrary non-partitioned regions of the Composite Image. In an embodiment, one or more non-partitioned regions may overlap with one another.

Operations in accordance with method 300a may be repeated as necessary to generate a plurality of Composite Images as needed, for example, wherein each image in the Training Data occupies at least one Composite Image of the plurality of Composite Images.

FIG. 5 illustrates the method 300b, an embodiment of generating a Composite Image, such as the Composite Image 480 illustrated in FIG. 6. The method 300b may be implemented using, for example, a Composite Data Generation Engine or a Composite Image Generation Engine in accordance with the present disclosure, such as the Composite Data Generation Engine 230 or the Composite Image Generation Engine 240, respectively, illustrated in FIG. 2. The method 300b may include one or more of the same operations 310, 320, and/or 350, as similarly illustrated and described above with respect to the method 300a.

The method 300b may include an operation 330 for cropping Image Data, including cropping Augmented Image Data, with bounding boxes. As illustrated for example in FIG. 5, the set of Image Data comprising Image Data 410, 412, 414, and 416, may be cropped to bound an Object of Interest in the Image Data, as illustrated in the respective bounded Image Data 410b, 412b, 414b, and 416b for subsequent placement in an initialized Composite Image 450, for use in generating a Composite Image such as the Composite Image 480. Embodiments of a bounding box include a polygon for encompassing the Image Data or an Object of Interest, including but not limited to: a square, a rectangle, or a quadrilateral. Embodiments of a bounding box may be defined as a center point with a circular or elliptical radius, or other limitation for bounding a perimeter of the bounding box about the center point. In an embodiment, the bounded Image Data is padded around the bounding-box, wherein each bounded Image Data may have a different or same amount of padding.

The method 300b may include an operation 380 for inserting or packing the cropped or bounded Image Data into the Composite Image. As illustrated for example in FIG. 6, the Composite Image 480 includes respective bounded Image Data 410b, 412b, 414b, and 416b filled into a much smaller proportion of the Composite Image 480 relative to the Composite Image 470 illustrated in FIG. 4. The operation 380 may employ a packing algorithm, such as a bin-packing algorithm, to select regions in the Composite Image to fill with the bounded Image Data. A filled area may be considered, for example, the area or region occupied by bounded and/or padded Image Data. In an embodiment, the packing algorithm fills a capacity of the Composite Image without overlapping any of the Image Data and/or without overlapping any of the bounded Image Data. In an embodiment, a packing algorithm fills a maximum capacity of the Composite Image with bounded Image Data without overlapping any of the bounded Image Data. Operations in accordance with method 300b may be repeated as necessary to generate a plurality of Composite Images as needed, for example, creating a plurality of Composite Images wherein each image in the Training Data occupies at least one Composite Image.

FIG. 7 illustrates the method 300c, an embodiment of generating a Composite Image, such as the Composite Image 490 illustrated in FIG. 8. The method 300c may be implemented using, for example, a Composite Data Generation Engine or a Composite Image Generation Engine, such as the Composite Data Generation Engine 230 or the Composite Image Generation Engine 240, respectively, illustrated in FIG. 2. The method 300c may include one or more of the same operations 310, 320, and/or 350, as similarly illustrated and described above with respect to the method 300a.

The method 300c may include an operation 340 for using a segmentation map or segmentation algorithm on Image Data, including on Augmented Image Data, to convey the outline of the Object of Interest contained in the corresponding Image Data. As illustrated for example in FIG. 8, the set of Image Data comprising Image Data 410, 412, 414, and 416, may be segmented to convey respective segmented Image Data 410c, 412c, 414c, and 416c for subsequent placement in an initialized Composite Image 450, to generate the Composite Image 490. In an embodiment wherein the Image Data comprises 2D photographic digital images encoded using the Portable Network Graphics (PNG) format and the Red Green Blue Alpha (RGBA) color model, the segmentation map may be implemented using the Alpha channel. Other segmentation map encodings and representations are possible.

The method 300c may include an operation 390 for inserting segmented Image Data into the Composite Image. As illustrated for example in FIG. 8, the Composite Image 490 includes respective segmented Image Data 410c, 412c, 414c, and 416c placed into a much smaller proportion of the Composite Image 490 relative to the Composite Image 470 illustrated in FIG. 4. The operation 390 may employ a placement algorithm for selecting regions in the Composite Image to fill with the segmented Image Data. Examples of a placement algorithm include, but are not limited to, a force-driven placement algorithm or a simulated annealing placement algorithm, for arranging segmented Image Data within the Composite Image. In an embodiment, the placement algorithm may include an objective function for preventing overlap between segmented Image Data in the Composite Image, including preventing overlap with padded segmented Image Data. An embodiment of an operation 390 may also place the segmented Image Data into the Composite Image allowing for overlap between the segmented Image Data. In such an embodiment, the placement algorithm may include an objective function for permitting a degree of permissible overlap between segmented Image Data. Other embodiments of a placement algorithm may be configured with an objective function or cost function to permit placement of the segmented Image Data in accordance with other placement traits.

Operations in accordance with method 300c may be repeated as necessary to generate a plurality of Composite Images as needed, for example, creating a plurality of Composite Images wherein each image in the Training Data occupies at least one Composite Image.

Figure 9:
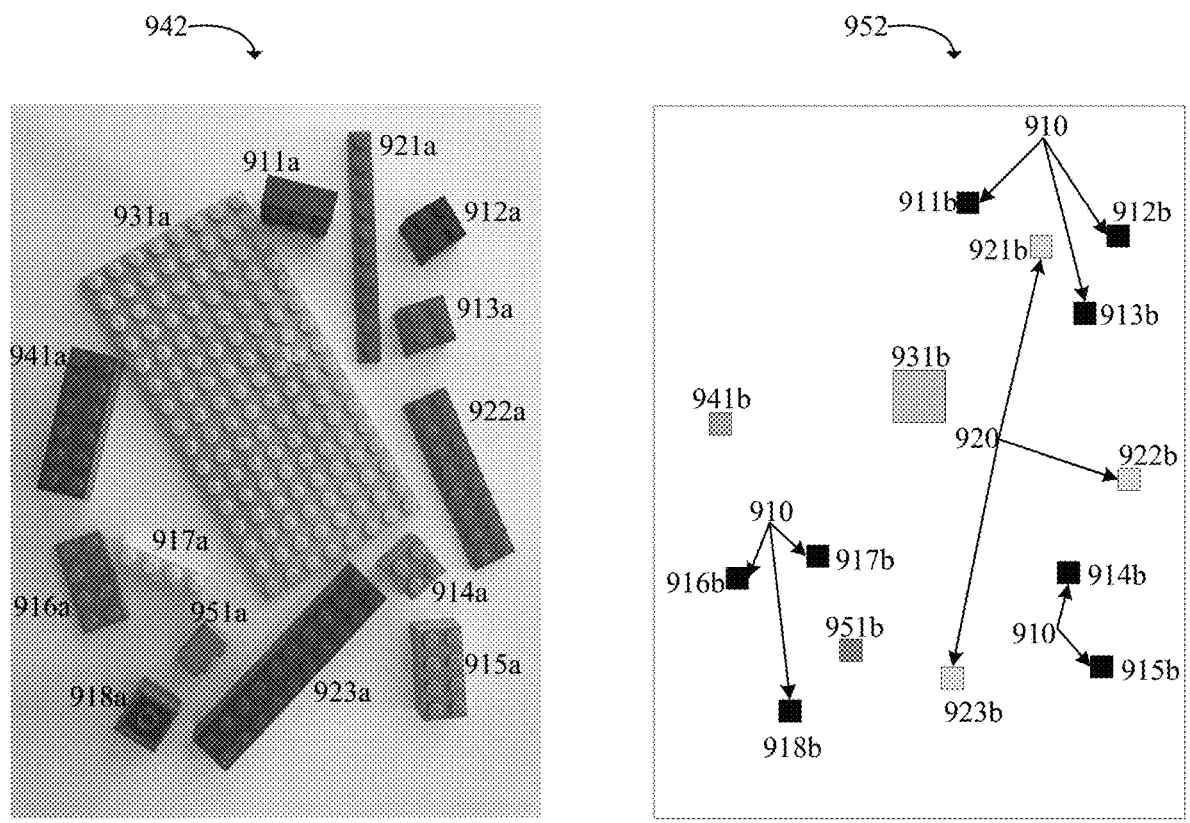
FIG. 9 illustrates a Composite Image of LEGO™ blocks and a corresponding Desired Response Map, generated in accordance with an embodiment of the present disclosure.

FIG. 9 illustrates a Composite Image 942 and its corresponding Desired Response Map 952 generated in accordance with an embodiment of the present disclosure. The Composite Image 942 may be generated, for example, using a Composite Data Generation Engine 230 and/or Composite Image Generation Engine 240, in accordance for example with one or more operations described in relation to the methods 300a, 300b, and 300c. The Desired Response Map 952 may be generated, for example, using a Composite Data Generation Engine 230 and/or Desired Response Map Generation Engine 250, in accordance with the present disclosure, for example, in accordance with one or more operations described in relation to the methods 1000a, 1000b, and 1000c, described further below. The Composite Image 942 and its corresponding Desired Response Map 952 may form Composite Training Data, such as for example, the Composite Training Data 260 comprising the respective Composite Image 242 and its corresponding Desired Response Map 252, as illustrated in FIG. 2.

The Composite Image 942 illustrated in FIG. 9 includes a plurality of Image Data 911a, 912a, 913a, 914a, 915a, 916a, 917a, 918a, 921a, 922a, 923a, 931a, 941a, and 951a corresponding to 2D images of various Objects of Interest, namely 3D LEGO™ blocks of different widths, lengths, colors, and orientations. For example, Image Data 922a comprises a red LEGO™ block dimensioned with a width of 2 and a length of 8, while Image Data 923a comprises a blue LEGO™ block dimensioned with a width of 2 and a length of 10. The Desired Response Map 952 illustrated in FIG. 9 includes a plurality of Desired Response Map entries 911b, 912b, 913b, 914b, 915b, 916b, 917b, 918b, 921b, 922b, 923b, 931b, 941b, and 951b generated based on visiting Composite Fragments in the Composite Image. In an embodiment, a Composite Fragment is a spatially contiguous portion of dimension D in a given region of a Composite Image, and includes the Image Date in that given region of the Composite Image.

A Desired Response Map includes value entries corresponding to Composite Fragments. In an embodiment, the value of each entry in the Desired Response Map is the desired output for a Machine Learning System when the input to the Machine Learning System's is the Composite Fragment corresponding to the given Desired Response Map entry. Embodiments of a Desired Response Map may include one entry for each Composite Fragment in the Composite Fragment Set, or for example, may include fewer entries than the number of Composite Fragments in the corresponding Composite Fragment Set. Advantageously, a Desired Response Map having fewer entries than the number of Composite Fragments in the Composite Fragment Set reduces the number of computations that may otherwise be required.

The Desired Response Map 952 comprises value entries relating to a plurality of classes. For example a first class of entries 910 for an Object-of-Interest comprises entries 911b, 912b, 913b, 914b, 915b, 916b, 917b, and 918b, corresponding to LEGO™ blocks 911a, 912a, 913a, 914a, 915a, 916a, 917a, and 918a having dimensions of 2×3, 2×2, 1×3, 1×4, or 2×4; a second class of entries 920 for a different Object-of-Interest comprises entries 921b, 922b, and 923b, corresponding to LEGO™ blocks 921a, 922a, 923a having dimensions of 2×8, 2×10, and 1×10; a third class corresponding to entry 931b for a different Object-of-Interest corresponding to the LEGO™ block 931a; a fourth class corresponding to entry 941b for a different Object-of-Interest corresponding to the LEGO™ block 941a; and, a fifth class corresponding to entry 951b for a different Object-of-Interest corresponding to the LEGO™ block 951a. Each class further includes a set of Desired Labels to for use in encoding the Desired Response Map entries based on assessing the visited Composite Fragment. For example, the first class of entries 910 may encode Desired Response Map entries with an in-scope response for LEGO™ blocks having 2×3 dimensions, an out-of-scope to LEGO™ blocks having 2×2, 1×3, 1×4, or 2×4 dimensions, and a don't care response for all other LEGO™ blocks. Accordingly, when visiting a Composite Fragment corresponding to the LEGO™ block 911a, the Desired Response Map may assign an in-scope response for the corresponding Desired Response Map entry 911b. As a further example, the second class of entries 920 may encode Desired Response Map entries with an in-scope response for LEGO™ blocks having 2×8 dimensions, an out-of-scope to LEGO™ blocks having 2×10 or 1×10 dimensions, and don't care response for all other LEGO™ blocks. Accordingly, when visiting the Composite Fragment corresponding to the LEGO™ block 921a, the Desired Response Map may assign an in-scope response for the corresponding Desired Response Map entry 921b. In an embodiment an in-scope response is assigned a value of 1 and out-of-scope is assigned a value of 0.

In an embodiment, the entries of a Desired Response Map may be organized in a way which inherently encodes the corresponding Composite Fragments spatial location within the Composite Image. For example, indexing the value entries for a Desired Response Map in a 2D array may inherently encode the value entry with a relative spatial location of corresponding Composite Fragments within the 2D Composite Image. As an illustrative example, consider a Composite Image having two-dimensional spatial dimensions of (ch,cw), and a target Machine Learning System having a two-dimensional input of spatial dimension D=(h, w). The number of possible Composite Fragments in the Composite Image is (ch−h+1)*(cw−w+1), and therefore a corresponding Desired Response Map indexed the same may also have (ch−h+1)*(cw−w+1) number of entries. In a two-dimensional embodiment, which may be generalized for higher-dimensional data, the Desired Response Map may be implemented with a two-dimensional data structure having (ch−h+1) rows and (cw−w+1) columns. The two-dimensional index of this data structure implicitly encodes the spatial relationship of each entry's corresponding Composite Fragment's relative spatial locations within the Composite Image.

Figure 10:
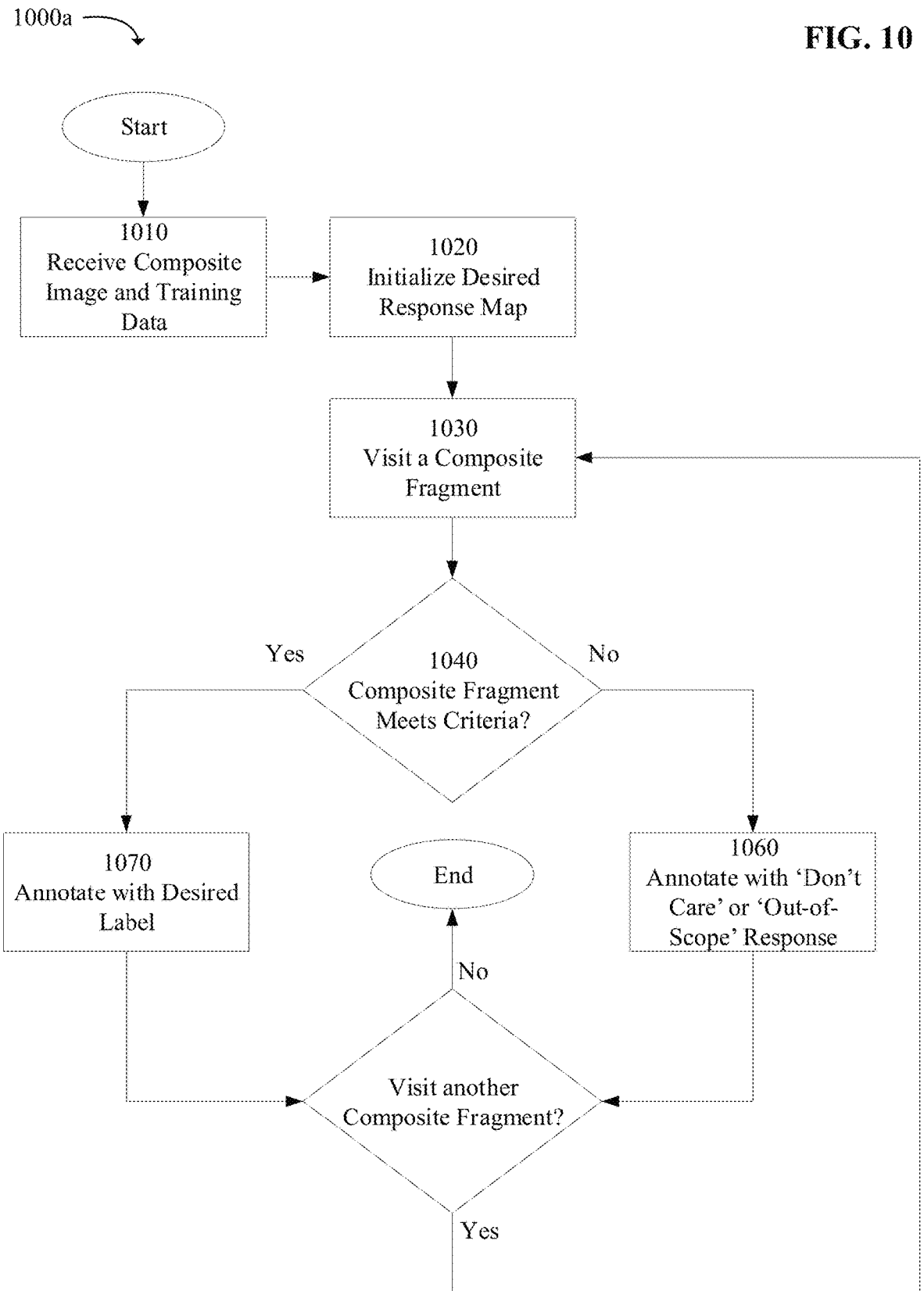
FIG. 10 is a flow chart of a method for generating a Desired Response Map in accordance with an embodiment of the present disclosure.
Figure 11:
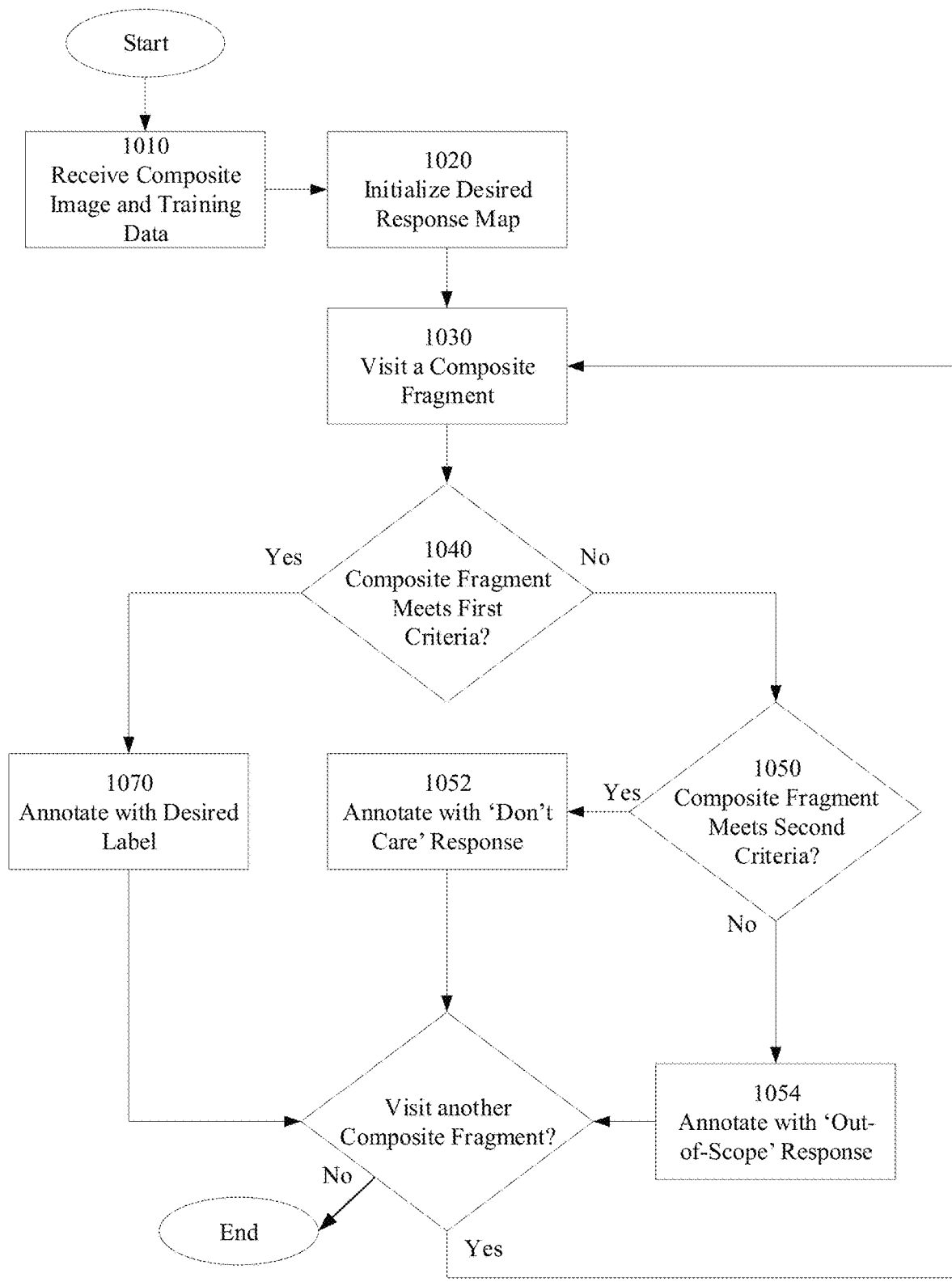
FIG. 11 is a flow chart of a method for generating a Desired Response Map in accordance with an embodiment of the present disclosure.
Figure 12:
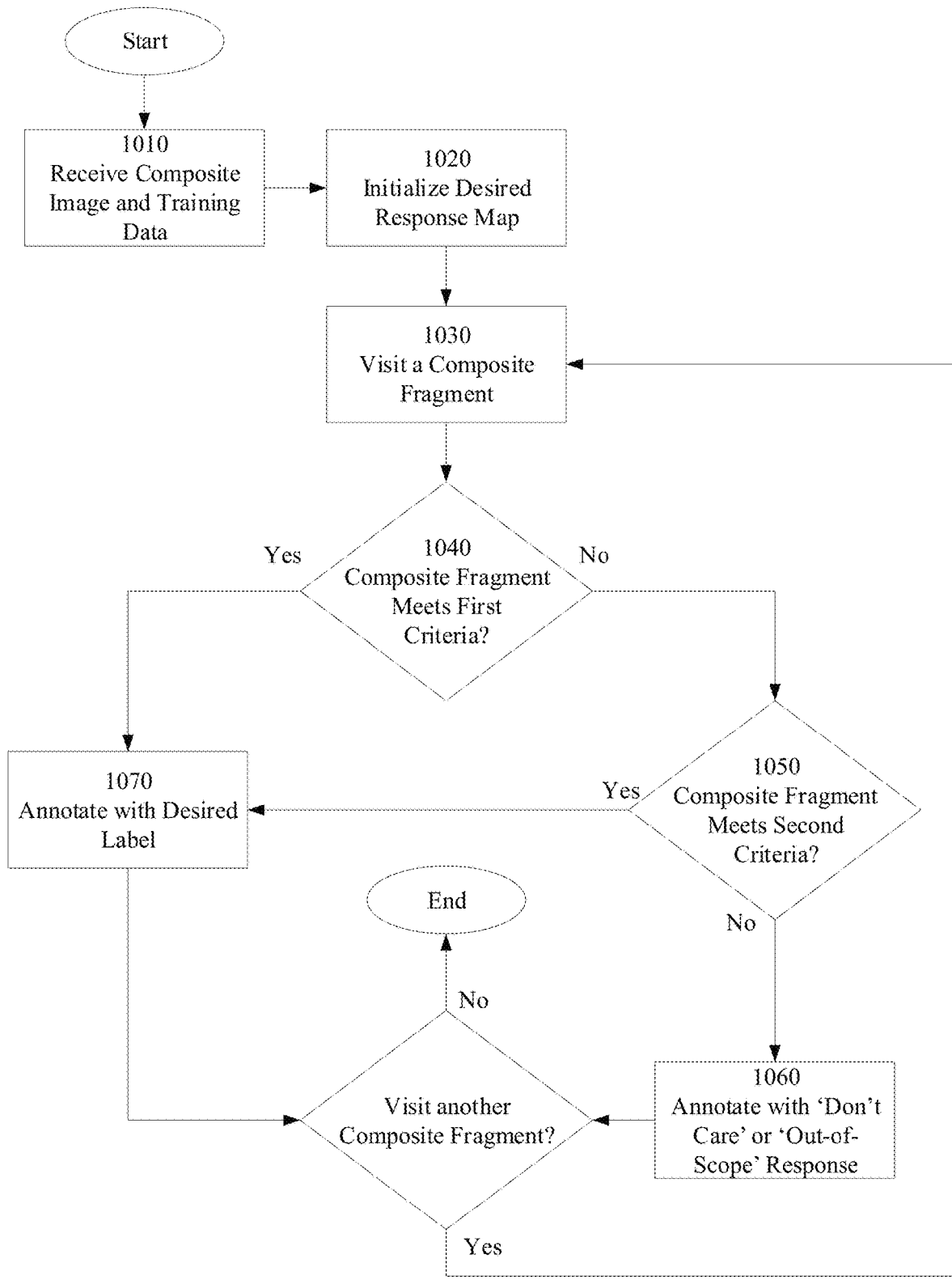
FIG. 12 is a flow chart of a method for generating a Desired Response Map in accordance with an embodiment of the present disclosure.

FIGS. 10, 11, and 12 illustrate respective methods 1000a, 1000b, and 1000c, for generating a Desired Response Map in accordance with the present disclosure, such as for example generating the Desired Response Map 952 illustrated in FIG. 9. The methods 1000a, 1000b, and 1000c may for example, reflect operations undertaken by embodiments of a Composite Data Generation and/or a Desired Response Map Generation in accordance with the present disclosure, such as for example the Composite Data Generation Engine 230 and the Desired Response Map Generation Engine 250, respectively, illustrated in the example System 220 of FIG. 2. Similarly, the Desired Response Map 952 may reflect embodiments of a Desired Response Map in accordance with the present disclosure, such as the Desired Response Map 252 illustrated in FIG. 2.

FIGS. 10, 11, and 12 illustrate the methods 1000a, 1000b, and 1000c, respectively, for generating a Desire Response Map, such as the Desire Response Map 252 or the Desired Response Map 952, in accordance with embodiments of the present disclosure. The operation of the methods 1000a, 1000b, and/or 1000c is not intended to be limiting but rather illustrates an example of generating a Desired Response Map. In some embodiments, the methods 1000a, 1000b, and/or 1000c may be accomplished with one or more additional operations not described, and/or without one or more of the operations described. Similarly, the order in which the operation of the methods 1000a, 1000b, and/or 1000c is illustrated and described below is not intended to be limiting, but rather illustrative of an example of generating a Desired Response Map in accordance with the present disclosure.

In some embodiments, the methods 1000a, 1000b, and/or 1000c may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the methods 1000a, 1000b, and/or 1000c in response to instructions stored electronically on an electronic storage medium. The one or more processing devices may include one or more devices configured through hardware, firmware, and/or software to be specifically designed for execution of one or more of the operations of the methods 1000a, 1000b, and/or 1000c.

FIG. 10 illustrates the method 1000a for generating a Desired Response Map, such as generating the Desired Response Map 252 or the Desired Response Map 952 illustrated in FIGS. 2 and 9, respectively. The method 1000a may be implemented using, for example, a Composite Data Generation Engine or a Desired Response Map Generation Engine in accordance with the present disclosure, such as the Composite Data Generation Engine 230 or the Desired Response Map Generation Engine 250, respectively, illustrated in FIG. 2.

The method 1000a may include an operation 1010 for receiving a Composite Image (or set of Composite Images) generated in accordance with an embodiment of the present disclosure; and, for receiving the corresponding Training Data—such as Training Data 210 illustrated in FIG. 2—used to create the Composite Image (or set of Composite Images). The Composite Image and the Desired Labels of the Training Data are used for generating a Desired Response Map. For example, the operation 1010 may include receiving a Composite Image generated in accordance with the present disclosure, such as a Composite Image generated in accordance with one or more operations of any one of the methods 300a, 300b, and 300c; and for receiving the corresponding Training Data comprising Desired Labels, for subsequent use in generating the Desired Response Map.

The method 1000a may include an operation 1020 for initializing a Desired Response Map for a corresponding Composite Image, wherein the Desired Response Map includes a value entry for a subset of Composite Fragments in the Composite Fragment Set of the Composite Image. A subset of Composite Fragments may include all Composite Fragments in the Composite Fragment Set, or may include fewer Composite Fragments than the Composite Fragment Set. In an embodiment, a data structure for the Desired Response Map is initialized with indexing corresponding to relative spatial coordinates within the Composite Image. In an embodiment, a data structure for the Desired Response Map is initialized to contain one entry for each Composite Fragment in a subset of Composite Fragments. In an embodiment, the subset of Composite Fragments is the whole Composite Fragment Set. In an embodiment, the Composite Fragments have a dimension D. In an embodiment, the dimension D of the Composite Fragments matches the input dimension of a Machine Learning System.

The method 1000a may include an operation 1030, for visiting a Composite Fragment. As detailed in other operations, visiting a Composite Fragment may further comprise assessing the Image Data in the Composite Fragment to determine whether or not the Composite Fragment meets certain criteria and then assigning a value entry to the Desired Response Map based on the criteria assessment.

The method 1000a may include an operation 1040, for assessing a visited Composite Fragment to determine whether the visited Composite Fragment meets an assessment criteria (e.g. desired label criteria). Assessment criteria may include, but is not limited to: whether the Composite Fragment comprises an Object of Interest, whether a center point of the Object of Interest is located at a center of the Composite Fragment (i.e. a Centered Composite Fragment), whether a Composite Fragment without an Object of Interest is within a spatial distance of a Centered Composite Fragment, and so forth. In an embodiment, a spatial distance threshold corresponding to a particular label may be predetermined by a human expert. In an embodiment a spatial distance threshold corresponding to a particular label may be based on an objective criteria. In an embodiment, the objective criteria is a distance from a center point dependent on a size of the Object of Interest, for example, the distance being proportional to the size of the Object of Interest. In an embodiment, the objective criteria is a distance from a center point not-dependent on a size of the Object of Interest. Based on the assessment of the visited Composite Fragment, the operation 1040 may trigger a further operation, such as operation 1060 or operation 1070, for annotating a corresponding value entry of the Desired Response Map corresponding to the outcome of the criteria assessment of operation 1040. For example, an Operation 1040 may comprise assessing the visited Composite Fragment based on a first criteria, such as whether the visited Composite Fragment is a Centered Composite Fragment, and may proceed to a further a operation 1070 when the Composite is a Centered Composite Fragment operation; or proceed to an operation 1060 when the Composite Fragment is not a Centered Composite Fragment. Accordingly, the method 1000a may proceed to annotate a value entry in the Desired Response Map for the visited Composite Fragment based on a further operation, such as operation 1070 or operation 1060. For example, if the visited Composite Fragment meets the first criteria of operation 1040, the method 1000a may proceed to the operation 1070 and annotate the corresponding value entry in the Desired Response Map with a value entry corresponding to the Desired Label for the Object-of-Interest, or other entry indicating that the visited Composite Fragment met the first criteria. Conversely, if the visited Composite Fragment does not meet the first criteria of operation 1040, the method 1000a may proceed to the operation 1060 and annotate the corresponding value entry in the Desired Response Map with a value entry corresponding to a Don't Care Response, Out-of-Scope class, a zero value, or other entry indicating the visited Composite Fragment did not meet the first criteria.

Operations in Accordance with the method 1000a may be repeated as necessary to generate a Desired Response Map. For example, the method 1000a may visit a plurality of Composite Fragments and repeat operations of the method 1000a for visiting, assessing, and annotating Composite Fragments in the Desired Response Map; the method 1000a may also be applied to a new Composite Image to generate a new corresponding Desired Response Map; and so forth. In an embodiment, the method 1000a may visit each Composite Fragment in a subset of the Composite Fragment Set. In an embodiment, a subset of the Composite Fragment Set may include all Composite Fragments in the Composite Fragment Set.

FIG. 11 illustrates the method 1000b, an embodiment of generating a Desired Response Map in accordance with the present disclosure, such as generating the Desired Response Map 252 or the Desired Response Map 952 illustrated in FIGS. 2 and 9, respectively. The method 1000b may be implemented using, for example, a Composite Data Generation Engine or a Desired Response Map Generation Engine in accordance with the present disclosure, such as the Composite Data Generation Engine 230 or the Desired Response Map Generation Engine 250, respectively, illustrated in FIG. 2. The method 1000b may include one or more of the same operations 1010, 1020, 1030, 1040, and/or 1070, as similarly illustrated and described with respect to the method 1000a.

The method 1000b may include an operation 1050 for evaluating additional assessment criteria, which may be optionally triggered based on an outcome of operation 1040. As depicted in the illustrative example of FIG. 11, if for example the visited Composite Fragment does not meet a first assessment criteria, the operation 1040 may trigger a further operation, such as operation 1050, for assessing the visited Composite Fragment based on a second assessment criteria. For example, an operation 1040 may assess whether the visited Composite Fragment is a Centered Composite Fragment. In the event the visited Composite Fragment is a Centered Composite Fragment, the method 1000b may trigger a further operation, such as operation 1070, for annotating the corresponding value entry in the Desired Response Map accordingly, such as with a value entry corresponding to a Desired Label for the Object of Interest. In the event however that the visited Composite Fragment is not a Centered Composite Fragment, the method 1000b may trigger a further operation, such as operation 1050, for assessing the visited Composite Fragment based on a second assessment criteria different from the first assessment criteria. Accordingly, the method 1000b may potentially assess a visited Composite Fragment based on a plurality of assessment criteria. In an embodiment, the first assessment criteria is whether the visited Composite Fragment is a Centered Composite Fragment; and, the second assessment criteria is whether the visited Composite Fragment is within a spatial distance of a Centered Composite Fragment.

Based on the assessment of the visited Composite Fragment, the operation 1050 may trigger a further operation, such as operation 1052 or operation 1052, for annotating a corresponding value entry of the Desired Response Map corresponding to the outcome of the criteria assessment of operation 1050. For example, an Operation 1050 may comprise assessing the visited Composite Fragment based on a second criteria different than the first criteria of operation 1040. For example, the operation 1040 may visit the Composite Fragment to assesses whether the visited Composite Fragment is a Centered Composited Fragment, and the operation 1050 may be triggered to assess a second criteria when the visited Fragment is not a Centered Composite Fragment, wherein the second criteria may include whether the visited Composite Fragment comprises an Object of Interest, whether the visited Composite Fragment is within a spatial distance of a Centered Composite Fragment, and so forth. The operation 1050 may then trigger a further operation based on whether the visited Composite Fragment meets the second criteria. For example, the method 1000b may proceed to annotate a value entry in the Desired Response Map for the visited Composite Fragment based on a further operation, such as operation 1052 or operation 1054. For example, if the visited Composite Fragment meets the second criteria of operation 1050, the method 1000b may proceed to the operation 1052 and annotate the corresponding value entry in the Desired Response Map with a value entry corresponding to a Don't Care Response, or other entry indicating that the visited Composite Fragment met the second criteria. Conversely, if the visited Composite Fragment does not meet the second criteria of operation 1050, the method 1000b may proceed to the operation 1054 and annotate the corresponding value entry in the Desired Response Map with a value entry corresponding to a Out-of-Scope response, or other entry indicating the visited Composite Fragment did not meet the second criteria.

Operations in Accordance with the method 1000b may be repeated as necessary to generate a Desired Response Map. For example, the method 1000b may visit a plurality of Composite Fragments and repeat operations of the method 1000b for visiting, assessing, and annotating Composite Fragments in the Desired Response Map; the method 1000b may also be applied to a new Composite Image to generate a new corresponding Desired Response Map; and so forth. In an embodiment, the method 1000b may visit each Composite Fragment in a subset of the Composite Fragment Set. In an embodiment, a subset of the Composite Fragment Set may include all Composite Fragments in the Composite Fragment Set.

FIG. 12 illustrates the method 1000c, an embodiment of generating a Desired Response Map in accordance with the present disclosure, such as generating the Desired Response Map 252 or the Desired Response Map 952 illustrated in FIGS. 2 and 9, respectively. The method 1000c may be implemented using, for example, a Composite Data Generation Engine or a Desired Response Map Generation Engine in accordance with the present disclosure, such as the Composite Data Generation Engine 230 or the Desired Response Map Generation Engine 250, respectively, illustrated in FIG. 2. The method 1000c may include one or more of the same operations 1010, 1020, 1030, 1040, 1060, and/or 1070, as similarly illustrated and described with respect to the method 1000a.

The method 1000 may include an operation 1050 for assessing a second criteria of a visited Composite Fragment, as similarly described with respect to the method 1000b. Based on the assessment of the visited Composite Fragment, the operation 1050 may trigger a further operation, such as operation 1070 or operation 1060, for annotating a corresponding value entry of the Desired Response Map corresponding to the outcome of the criteria assessment of operation 1050. For example, an Operation 1050 may comprise assessing the visited Composite Fragment based on a second criteria different than the first criteria of operation 1040. For example, the operation 1040 may visit the Composite Fragment to assesses whether the visited Composite Fragment is a Centered Composited Fragment, and the operation 1050 may be triggered to assess a second criteria when the visited Fragment is not a Centered Composite Fragment, wherein the second criteria may include whether the visited Composite Fragment comprises an Object of Interest, whether the visited Composite Fragment is within a spatial distance of a Centered Composite Fragment, and so forth. The operation 1050 may then trigger a further operation based on whether the visited Composite Fragment meets the second criteria. For example, the method 1000c may proceed to annotate a value entry in the Desired Response Map for the visited Composite Fragment based on a further operation, such as operation 1070 or operation 1060. For example, if the visited Composite Fragment meets the second criteria of operation 1050, the method 1000c may proceed to the operation 1070 and annotate the corresponding value entry in the Desired Response Map with a value entry corresponding to a Desired Label, or other entry indicating that the visited Composite Fragment met the second criteria, such as for example, the Desired Label of the Centered Composited Fragment that the visited Composite Fragment is closest to. Conversely, if the visited Composite Fragment does not meet the second criteria of operation 1050, the method 1000c may proceed to the operation 1060 and annotate the corresponding value entry in the Desired Response Map with a value entry corresponding to a Don't Care Response, Out-of-Scope class, a zero value, or other entry indicating the visited Composite Fragment did not meet the second criteria.

Operations in Accordance with the method 1000c may be repeated as necessary to generate a Desired Response Map. For example, the method 1000c may visit a plurality of Composite Fragments and repeat operations of the method 1000c for visiting, assessing, and annotating Composite Fragments in the Desired Response Map; the method 1000c may also be applied to a new Composite Image to generate a new corresponding Desired Response Map; and so forth. In an embodiment, the method 1000c may visit each Composite Fragment in a subset of the Composite Fragment Set. In an embodiment, a subset of the Composite Fragment Set may include all Composite Fragments in the Composite Fragment Set.

Figure 13:
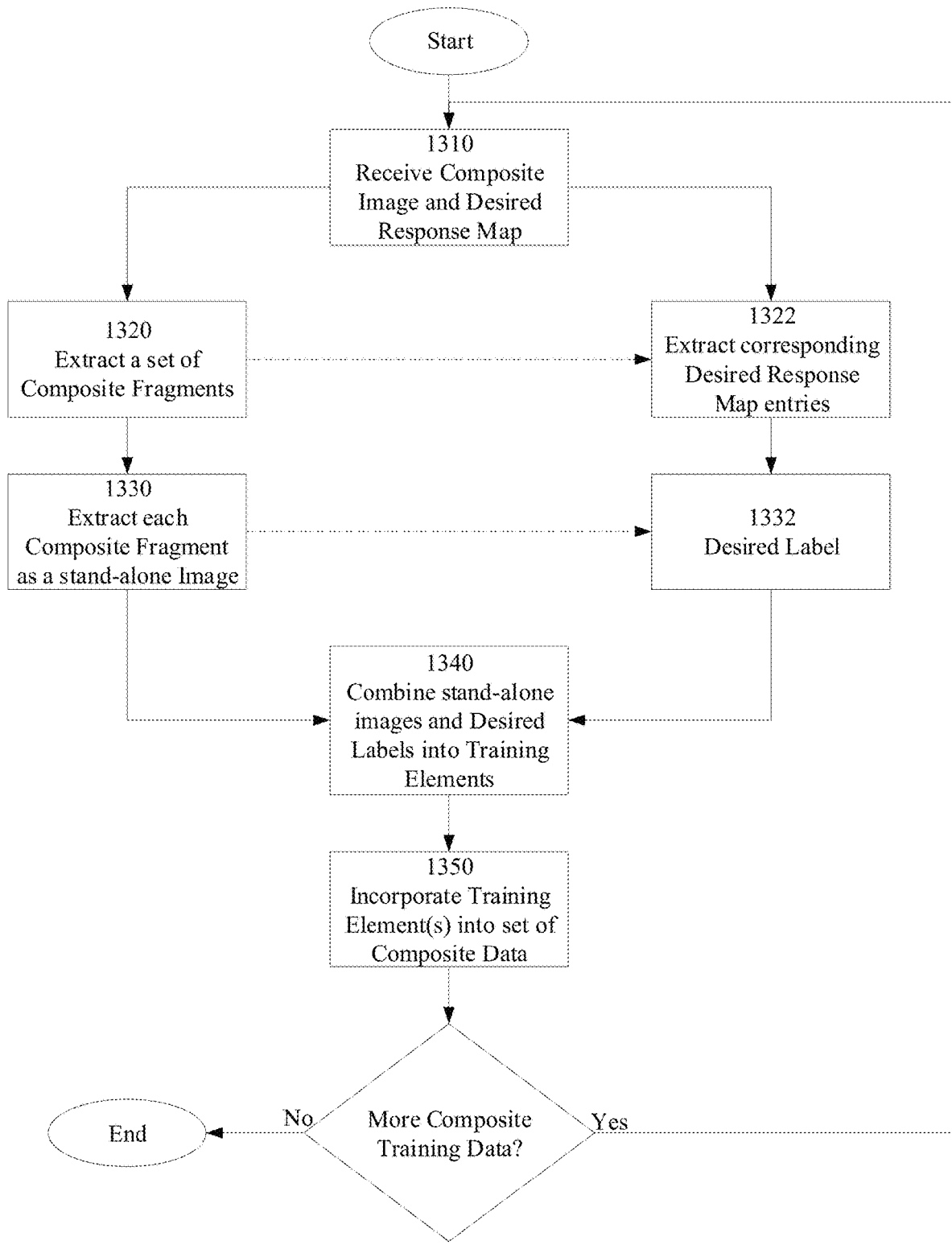
FIG. 13 is a flow chart of a method for generating Composite Data in accordance with an embodiment of the present disclosure, for use in training a Machine Learning System.

FIG. 13 illustrates a method 1300, for generating Training Elements for Composite Data in accordance with the present disclosure, such as for generating the Composite Data 272 illustrated in FIG. 2, for use in training a Machine Learning System, such as Machine Learning System 290. The method 1300 may for example, reflect operations undertaken by embodiments of a Composite Training Engine and/or a Composite Data Processing Engine in accordance with the present disclosure, such as for example the Composite Training Engine 270 and the Composite Data Processing Engine 280, respectively, illustrated in the example System 220 of FIG. 2.

FIG. 13 illustrates the method 1300 for generating Training Elements for Composite Data, such as for generating the Composite Data 272, in accordance with embodiments of the present disclosure. The operation of the method 1300 is not intended to be limiting but rather illustrates an example of generating Training Elements for a set of Composite Data. In some embodiments, the method 1300 may be accomplished with one or more additional operations not described, and/or without one or more of the operations described. Similarly, the order in which the operation of the method 1300 is illustrated and described below is not intended to be limiting, but rather illustrative of an example of generating Training Elements for a set of Composite Data in accordance with the present disclosure.

In some embodiments, the method 1300 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the method 1300 in response to instructions stored electronically on an electronic storage medium. The one or more processing devices may include one or more devices configured through hardware, firmware, and/or software to be specifically designed for execution of one or more of the operations of the method 1300.

Method 1300 may include an operation 1310 for receiving Composite Training Data comprising a Composite Image and a corresponding Desired Response Map in accordance with an embodiment of the present disclosure such as the Composite Training Data 260 comprising the Composite Image 242 and the corresponding Desired Response Map 252 as illustrated in FIG. 2. The operation 1310 may receive the Composite Training Data from a Composite Data Generation in accordance with the present disclosure, such as the Composite Data Generation Engine 230 illustrated in FIG. 2; or may for example, receive the Composite Image and the Desired Response Map from a Composite Image Generation Engine 240 and a Desired Response Map Generation Engine 250, respectively, as also illustrated in FIG. 2.

Method 1300 may include an operation 1320 and corresponding operation 1322 for extracting a set of Composite Fragments from a Composite Image, and extracting the corresponding Desired Response Map entries from the Desired Response Map, respectively. In an embodiment, all Composite Fragments from the Composite Image and their corresponding entries from the Desired Response Map are extracted. In an embodiment, a subset of Composite Fragments from the Composite Image and their corresponding entries from the Desired Response Map are extracted. Method 1300 may further include an operation 1330 and corresponding operation 1332 for extracting a Composite Fragment into a stand-alone image and assigning the corresponding Desired Response Map entry as the stand alone image's Desired Label, respectively. For example, operation 1330 may extract a Composite Fragment into a stand-alone image, for each of the Composite Fragments extracted in operation 1320; and, operation 1332 may assign the corresponding Desired Response Map entry extracted in operation 1322 as the Desired Label for the stand-alone image created in operation 1330. The method 1300 may further include an operation 1340, for creating a Training Element for a set of Composite Data. For example, the stand-alone image and corresponding Desired Label from respective operations 1330 and 1332 may form a Training Element comprising an image and a label. The method 1300 may further include an operation 1350 to incorporate the Training Element of operation 1340 into a set of Composite Data, such as the set of Composite Data 272 illustrated in FIG. 2.

Operations in accordance with the method 1300 may be repeated as necessary to generate a plurality of Training Elements from a Composite Image to create a set of Composite Data for use in training a Machine Learning System. Furthermore, operations in accordance with method 1300 may be repeated as necessary for a plurality of Composite Images and corresponding Desired Response Maps, for generating a plurality of Composite Data for use in training a Machine Learning System. In an embodiment, the method 1300 is performed offline, to create one or more sets of Composite Data prior to training a Machine Learning System. In an embodiment, the method 1300 is performed in real-time, to provide the Composite Data to the Machine Learning System during the Training Process. In an embodiment, the method 1300 is performed in real-time, and the Composite Data is provided to the Machine Learning System on-the-fly during the Training Process, without writing the extracted Composite Fragments and extracted Desired Labels to disk storage, advantageously providing significant improvements in computational throughput and memory requirements.

Figure 14:
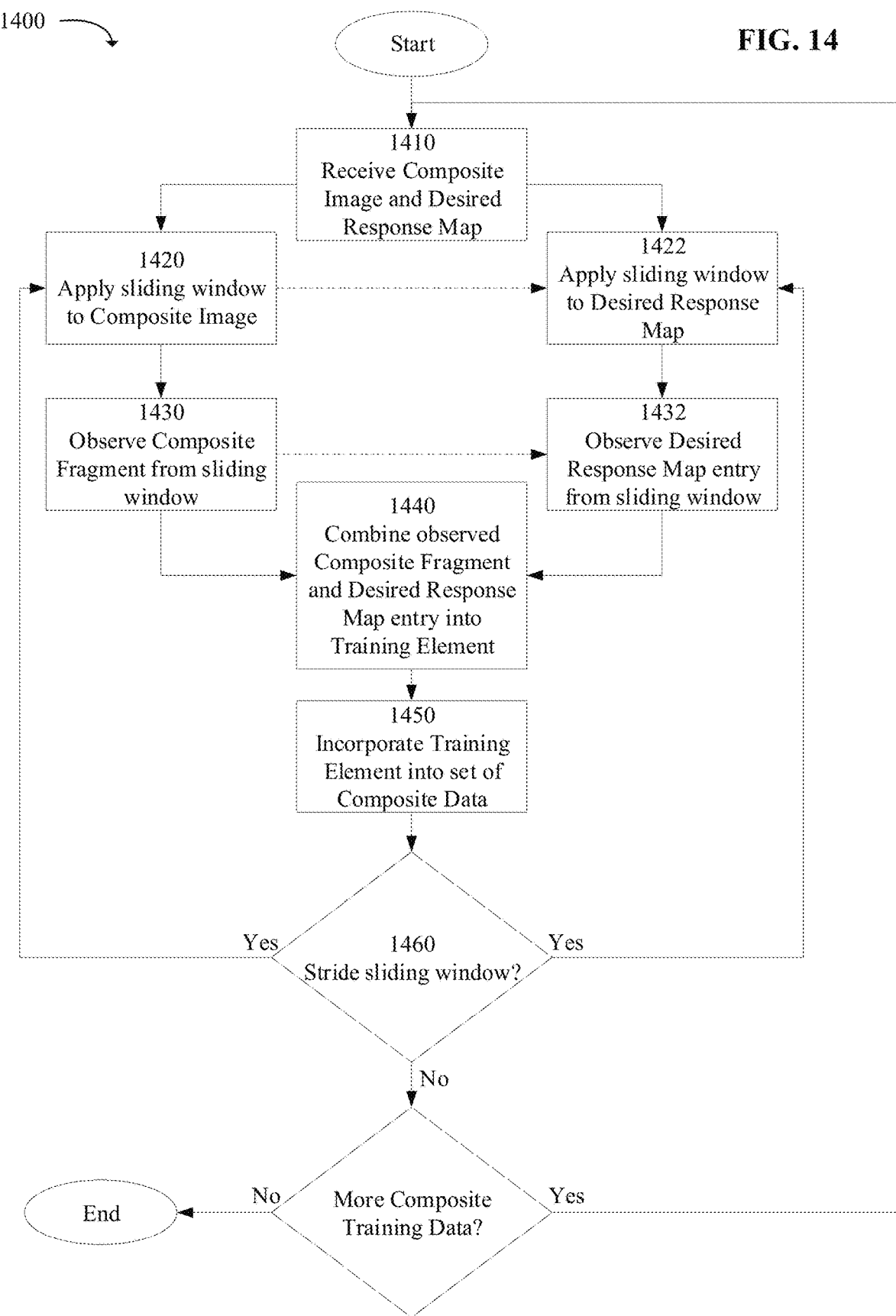
FIG. 14 is a flow chart of a method for generating Composite Data in accordance with an embodiment of the present disclosure, for use in training a Machine Learning System.

FIG. 14 illustrates a method 1400, for generating Training Elements for Composite Data in accordance with the present disclosure, such as for generating the Composite Data 272 illustrated in FIG. 2, for use in training a Machine Learning System, such as Machine Learning System 290. The method 1400 may for example, reflect operations undertaken by embodiments of a Composite Training Engine and/or a Composite Data Processing Engine in accordance with the present disclosure, such as for example the Composite Training Engine 270 and the Composite Data Processing Engine 280, respectively, illustrated in the example System 220 of FIG. 2.

FIG. 14 illustrates the method 1400 for generating Training Elements for Composite Data, such as for generating the Composite Data 272, in accordance with embodiments of the present disclosure. The operation of the method 1400 is not intended to be limiting but rather illustrates an example of generating Training Elements for a set of Composite Data. In some embodiments, the method 1400 may be accomplished with one or more additional operations not described, and/or without one or more of the operations described. Similarly, the order in which the operation of the method 1400 is illustrated and described below is not intended to be limiting, but rather illustrative of an example of generating Training Elements for a set of Composite Data in accordance with the present disclosure.

In some embodiments, the method 1400 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the method 1400 in response to instructions stored electronically on an electronic storage medium. The one or more processing devices may include one or more devices configured through hardware, firmware, and/or software to be specifically designed for execution of one or more of the operations of the method 1400.

Method 1400 may include an operation 1410 for receiving Composite Training Data comprising a Composite Image and a corresponding Desired Response Map in accordance with an embodiment of the present disclosure such as the Composite Training Data 260 comprising the Composite Image 242 and the corresponding Desired Response Map 252 as illustrated in FIG. 2. The operation 1410 may receive the Composite Training Data from a Composite Data Generation in accordance with the present disclosure, such as the Composite Data Generation Engine 230 illustrated in FIG. 2; or may for example, receive the Composite Image and the Desired Response Map from a Composite Image Generation Engine 240 and a Desired Response Map Generation Engine 250, respectively, as also illustrated in FIG. 2.

Method 1400 may include an operation 1420 and corresponding operation 1422 for applying a sliding window to a Composite Image and a corresponding Desired Response Map, respectively. As described below with regards to other operations, the method 1400 strides the sliding window over portions of the Composite Image to observe a portion of the Composite Image within each stride of the sliding window; and, strides the sliding window over corresponding portions of the Desired Response Map to similarly observe a corresponding portion of the Desired Response map within each stride of the sliding window. The paired observations from the Composite Image and the corresponding Desired Response Map are used to form Training Elements for a set of Composite Data. In an embodiment, the sliding window has a dimension S. In an embodiment, the method 1400 may apply an image resizing algorithm to resize the observed image of dimension S to match the input dimension D of a Machine Learning System. In an embodiment, the sliding window has a dimension S equal to the input dimension D of a Machine Learning System.

The method 1400 may include an operation 1430 and corresponding operation 1432 for observing a Composite Fragment of the Composite Image and, observing a corresponding entry of the Desired Response Map, respectively. For example, operation 1430 may observe a Composite Fragment within a region of the Composite Image occupied by the sliding window; and, operation 1432 may observe a corresponding entry within a region of the Desired Response Map correspondingly occupied by the sliding window. The method 1400 may further include an operation 1440, for creating a Training Element for a set of Composite Data. For example, the Training Element may comprise a stand-alone image and corresponding Desired Label based on the observed Composite Fragment and observed Desired Response Map entry from respective operations 1430 and 1432. The method 1400 may further include an operation 1450 to incorporate the Training Element of operation 1440 into a set of Composite Data, such as the set of Composite Data 272 illustrated in FIG. 2.

Operations in accordance with the method 1400 may be repeated as necessary to generate a plurality of Training Elements from a Composite Image to create a set of Composite Data for use in training a Machine Learning System. For example, the Method 1400 may include an operation 1460 to determine whether the sliding window has strided over the entirety of the Composite Image and correspondingly over the Desired Response Map, and may thus stride the sliding window to a new location and repeat operations of the Method 1400 as may be necessary to generate a further Training Element based on the new location of the sliding window. In an embodiment, operation 1460 strides the sliding window by a value of 1. In an embodiment, operation 1460 strides the sliding window by an integer value greater than 1. Furthermore, operations in accordance with method 1400 may be repeated as necessary for a plurality of Composite Images and corresponding Desired Response Maps, for generating a plurality of Composite Data for use in training a Machine Learning System. In an embodiment, the method 1400 is performed offline, to create one or more sets of Composite Data prior to training a Machine Learning System. In an embodiment, the method 1400 is performed in real-time, to provide the Composite Data to the Machine Learning System during the Training Process. In an embodiment, the method 1400 is performed in real-time, and the Composite Data is provided to the Machine Learning System on-the-fly during the Training Process, without writing the observed Composite Fragments and observed Desired Response Map entries to disk storage, advantageously providing significant improvements in computational throughput and memory requirements.

Figure 15:
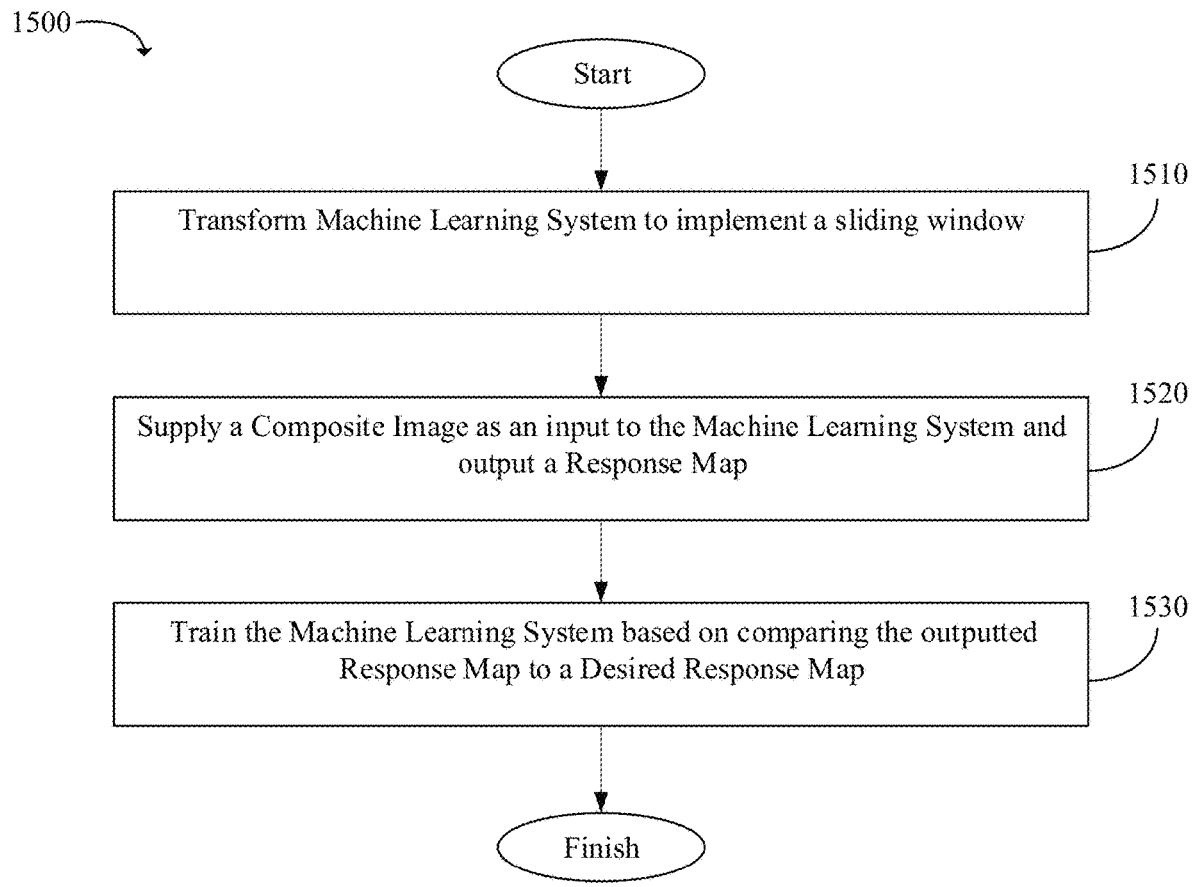
FIG. 15 is a flow chart of a method for transforming a Machine Learning System to apply a sliding window to a Composite Image in accordance with an embodiment of the present disclosure.

FIG. 15 illustrates a method 1500, for transforming a Machine Learning System, such as the Machine Learning System 290 illustrated in FIG. 2, to implement a sliding window on a Composite Image. The method 1500 may for example, reflect operations undertaken by embodiments of a Composite Training Engine and/or a Composite Data Processing Engine in accordance with the present disclosure, such as for example the Composite Training Engine 270 and the Composite Data Processing Engine 280, respectively, illustrated in the example System 220 of FIG. 2.

FIG. 15 illustrates the method 1500 for transforming a Machine Learning System, such as the Machine Learning System 290 illustrated in FIG. 2, to implement a sliding window on a Composite Image in accordance with embodiments of the present disclosure. The operation of the method 1500 is not intended to be limiting but rather illustrates an example of transforming a Machine Learning System to implement a sliding window on a Composite Image. In some embodiments, the method 1500 may be accomplished with one or more additional operations not described, and/or without one or more of the operations described. Similarly, the order in which the operation of the method 1500 is illustrated and described below is not intended to be limiting, but rather illustrative of an example of transforming a Machine Learning System to implement a sliding window on a Composite Image in accordance with the present disclosure.

In some embodiments, the method 1500 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the method 1500 in response to instructions stored electronically on an electronic storage medium. The one or more processing devices may include one or more devices configured through hardware, firmware, and/or software to be specifically designed for execution of one or more of the operations of the method 1500.

The method 1500 is configured to leverage the sliding window effect inherent to Machine Learning Systems having convolutional layers. For example, the method 1500 may include an operation 1510 for transforming an internal architecture of the Machine Learning System to implement a sliding window, such as the sliding window described in relation to the method 1400. In an embodiment, an internal architecture of the Machine Learning System is configured to perform a sliding window on a Composite Image in a single pass; in other words, the Machine Learning System may process multiple Composite Fragments from the same Composite Image in a single execution or pass of the Composite Image. In an embodiment, the Machine Learning System may be a Deep Convolutional Neural Network that includes but is not limited to, both convolutional and fully-connected layers. In such an embodiment, the operation 1510 may transform the fully-connected layers into convolutional layers while maintaining functional equivalence. The method 1500 may include a further operation 1520 for supplying a Composite Image as an input to the Machine Learning System, for leveraging the sliding window effect inherent to the convolutional layers of the Machine Learning System to inspect Composite Fragments in the Composite Image wherein the Machine Learn System yields an effective sliding window over the Composite Image, wherein an output of the Machine Learning System is a Response Map. In an embodiment, an internal architecture determines a stride of the sliding window.

The method 1500 may include a further operation 1530 for training the Machine Learning System. In an embodiment, a stride of the sliding window is 1 and the Machine Learning System may be trained by directly minimizing the loss between the Response Map output from the operation 1520 and a Desired Response Map having a sliding window with a stride of 1, generated in accordance with the present disclosure. In an embodiment, the Desired Response Map may be generated using a sliding window having a stride which matches the stride of the Machine Learning System. In an embodiment, a stride of the sliding window is an integer value greater than 1; in such embodiments, the Machine Learning System does not inspect every Composite Fragment in the Composite Image, and the Response Map output by the operation 1520 may be smaller than a corresponding Desired Response Map generated having a stride of 1. Consequently, the operation 1530 may include additional steps to conform the Desired Response Map to match the dimension of the Response Map. In an embodiment the Desired Response Map may be re-interpreted based on directly sampling it with a stride to produce a new Desired Response Map to match the dimension of the Response Map generated by the operation 1520. In an embodiment, the Desired Response Map may be re-interpreted based on sampling the Desired Response Map using a stride s and using a value based function to compute a value for the sampled location in the re-interpreted Desired Response Map. In an embodiment, the value based function computes a value for the sample location based on the values in the Desired Response Map nearest to the sampled location. In an embodiment, the value based function is a majority function.

Operations in accordance with the method 1500 may be repeated as necessary to train the Machine Learning System.

Figure 16:
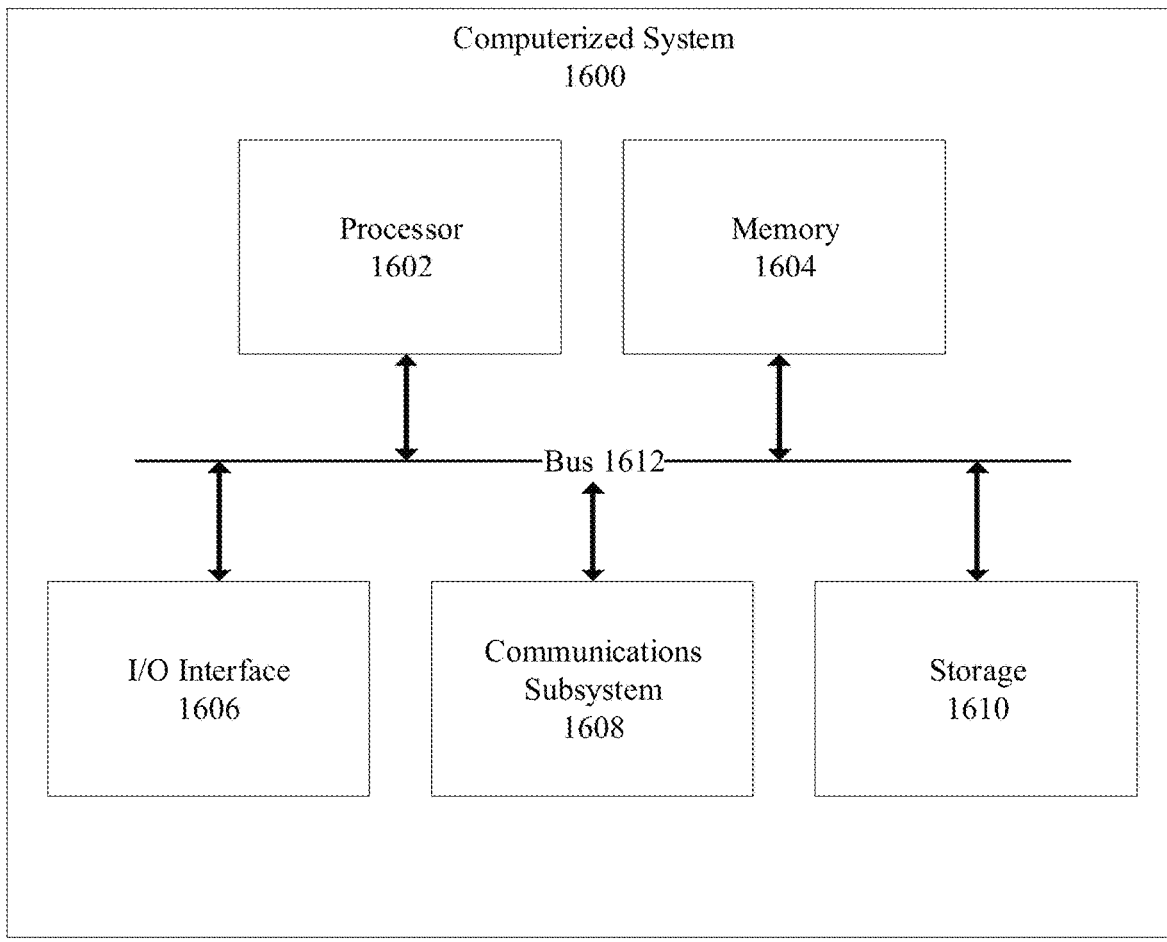
FIG. 16 is a block diagram of an example computing device or system for implementing systems and methods for generating Composite Data in accordance with the present disclosure.

FIG. 16 is a block diagram of an example computerized device or system 1600 that may be used in implementing one or more aspects or components of an embodiment of a system and method for generating and simulating vehicle events in accordance with the present disclosure, for example implementing one or more operations as described in relation to the methods 100, 300a, 300b, 300c, 1000a, 1000b, 1000c, 1300, 1400, and/or 1500; and/or, for example, for use in implementing various aspects of the System 200, including the Composite Data Generation Engine 230, the Composite Image Generation Engine 240, the Desire Response Map Generation 250, the Composite Training Engine 270, the Composite Data Processing Engine 280, and/or the Machine Learning System 290.

Computerized system 1600 may include one or more of a processor 1602, memory 1604, a mass storage device 1610, an input/output (I/O) interface 1606, and a communications subsystem 1608. Further, system 1600 may comprise multiples, for example multiple processors 1602, and/or multiple memories 1604, etc. Processor 1602 may comprise one or more of a digital processor, an analog processor, a digital circuit designed to process information, an analog circuit designed to process information, a state machine, and/or other mechanisms for electronically processing information. These processing units may be physically located within the same device, or the processor 1602 may represent processing functionality of a plurality of devices operating in coordination. The processor 1602 may be configured to execute modules by software; hardware; firmware; some combination of software, hardware, and/or firmware; and/or other mechanisms for configuring processing capabilities on the processor 1602, or to otherwise perform the functionality attributed to the module and may include one or more physical processors during execution of processor readable instructions, the processor readable instructions, circuitry, hardware, storage media, or any other components.

One or more of the components or subsystems of computerized system 1600 may be interconnected by way of one or more buses 1612 or in any other suitable manner.

The bus 1612 may be one or more of any type of several bus architectures including a memory bus, storage bus, memory controller bus, peripheral bus, or the like. The CPU 1602 may comprise any type of electronic data processor. The memory 1604 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1610 may comprise any type of storage device configured to store data, programs, and other information and to make the data, programs, and other information accessible via the bus 1612. The mass storage device 1610 may comprise one or more of a solid state drive, hard disk drive, a magnetic disk drive, an optical disk drive, or the like. In some embodiments, data, programs, or other information may be stored remotely, for example in the cloud. Computerized system 1600 may send or receive information to the remote storage in any suitable way, including via communications subsystem 1608 over a network or other data communication medium.

The I/O interface 1606 may provide interfaces for enabling wired and/or wireless communications between computerized system 1600 and one or more other devices or systems. For instance, I/O interface 1606 may be used to communicatively couple with sensors, such as cameras or video cameras. Furthermore, additional or fewer interfaces may be utilized. For example, one or more serial interfaces such as Universal Serial Bus (USB) (not shown) may be provided.

Computerized system 1600 may be used to configure, operate, control, monitor, sense, and/or adjust devices, systems, and/or methods according to the present disclosure.

A communications subsystem 1608 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 1608 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 1608 may include one or more ports or other components (not shown) for one or more wired connections. Additionally or alternatively, communication subsystem 1608 may include one or more transmitters, receivers, and/or antenna elements (none of which are shown).

Computerized system 1600 of FIG. 16 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of generating composite based data for use in training machine learning systems, comprising:
   receiving a plurality of images, each of the plurality of images having a corresponding label;
   generating a composite image comprising the plurality of images, each of the plurality of images occupying a region of the composite image;
   generating a response map for the composite image, the response map having a plurality of response entries, each response entry encoded with a desired label corresponding to a fragment of the composite image, and
   generating composite data comprising the desired label of a response entry and image data corresponding to the fragment of the composite image;
   wherein generating the plurality of response entries for the response map, comprises:
   for each of the plurality of response entries:
      visiting the fragment of the composite image corresponding to the response entry;
      determining the desired label based on assessing image data associated with the visited fragment, and
      encoding the response entry with the desired label.

2. The method according to claim 1, wherein encoding the response entry further comprises:
assessing the image data associated with the visited fragment against a labeling criteria, and
encoding the response entry with the desired label associated with an in-scope response when the assessed image data complies with the labeling criteria.

3. The method according to claim 2, wherein generating the plurality of response entries for the response map further comprises:
for each of the plurality of response entries:
encoding the response entry with a location within the composite image corresponding to the visited fragment.

4. The method according to claim 3, wherein encoding the response entry further comprises:
encoding the response entry with the desired label associated with a different response entry, when:
the assessed image data does not comply with the labeling criteria;
the different response entry complies with the labeling criteria, and
a location of the different response map entry is within a distance of a location of the response entry.

5. The method according to claim 4, wherein the labeling criteria comprises whether the assessed image data includes an object of interest centered within the assessed image data.

6. The method according to claim 5, further comprising:
partitioning the composite image into a plurality of non-overlapping regions, wherein each image of the plurality of images occupies a different non-overlapping region of the composite image.

7. The method according to claim 5, further comprising:
partitioning the composite image into a plurality of non-overlapping regions, wherein each image of the plurality of images occupies a center location of a different non-overlapping region of the composite image.

8. The method according to claim 6, wherein generating the composite data comprises:
extracting, from the composite image, a plurality of image fragments, each corresponding to the image data of a given fragment of the composite image, and
extracting, from the response map, a plurality of desired labels, each corresponding to the desired label of a given response entry of the response map
wherein the composite data comprises the plurality of image fragments and the plurality of desired labels corresponding thereto.

9. The method according to claim 8, further comprising:
providing the composite data to a machine learning system for use in training the machine learning system during a training process thereof, wherein providing the composite data comprises:
providing, to the machine learning system during the training process, the plurality of image fragments on the fly with the extracting thereof, and
providing, to the machine learning system during the training process, the plurality of desired labels on the fly with the extracting thereof.

10. The method according to claim 8, wherein extracting the set of image fragments and the set of desired labels, comprises:
striding a sliding window about the composite image and correspondingly about the response map, and
observing, at each stride:
an image fragment of the composite image based on an area of the composite image occupied by the sliding window, and
a corresponding desired label of the response map based on an area of the response map occupied by the sliding window;
wherein the plurality of fragment images comprises the observed image fragments, and the plurality of desired labels comprises the observed corresponding desired labels.

11. The method according to claim 10, wherein a dimension of the sliding window matches an input dimension of a machine learning system.

12. The method according to claim 8, further comprising:
providing the composite image to a machine learning system for use in training the machine learning system to generate the response map, the machine learning system configured to generate a machine learning response map based on emulating a sliding window effect about the composite image.

13. The method according to 12, wherein the machine learning system is a convolutional neural network having convolutional layers for use in implementing the sliding window effect.

14. The method according to 13, further comprising:
evaluating a loss between the machine learning response map and the response map, and
adjusting a parameter of the machine learning system based on the evaluated loss.

15. The method according to 14, wherein a stride of the sliding window effect is 1 and evaluating the loss comprises directly minimizing the loss between the machine learning response map and the response map.

16. The method according to claim 13, wherein a stride of the sliding window effect is greater than 1 and a dimension of the machine learning response map is less than a dimension of the response map, the method further comprising:
generating a reinterpreted machine learning response map based on sampling the machine learning response map with a sliding window having a stride selected to cause a dimension of the reinterpreted machine learning response map to match the dimension of the response map, and
evaluating the loss comprises directly minimizing the loss between the reinterpreted machine learning response map and the response map.

17. A non-transitory computer-readable medium having instructions stored thereon that, when executed by a computing device, cause the computing device to perform the method for generating composite based data according to claim 1.

18. The method according to claim 1, wherein encoding the response entry further comprises:
assessing the image data of the visited fragment against a first labeling criteria and a second labeling criteria;
encoding the response entry with the desired label associated with an in-scope response when the assessed image data complies with either the first or second labeling criteria, or complies with both labeling criteria.

19. The method according to claim 1, wherein encoding the response entry further comprises:
assessing the image data of the visited fragment against a first labeling criteria and a second labeling criteria;
encoding the response entry with the desired label associated with an in-scope response when the assessed image data complies with the first labeling criteria, and encoding the response entry with the desired label associated with an out-of-scope response when the assessed image data does not comply with the first labeling criteria and does comply with the second labeling criteria.

20. The method according to claim 19, wherein encoding the response entry further comprises:
encoding the response entry with the desired label associated with a don't-care response when the assessed image data does not comply with the first labeling criteria and does not comply with the second labeling criteria.

21. The method according to claim 20, wherein the first labeling criteria comprises whether the assessed image data includes an object of interest.

22. The method according to claim 21, wherein the second labeling criteria comprises whether the response entry for the fragment of the assessed image data is within a distance of a different response entry that complies with the first labeling criteria.

23. The method according to claim 20, wherein the first labeling criteria comprises whether the assessed image data includes an object of interest centered within the assessed image data.

24. The method according to claim 1, wherein the plurality of response entries correspond to a subset of all possible fragments of the composite image.

25. The method according to claim 1, wherein a dimension of the fragment of the composite image matches an input dimension of a machine learning system.

* * * * *